(12) United States Patent
Sunde

(10) Patent No.: US 9,725,102 B2
(45) Date of Patent: Aug. 8, 2017

(54) BRAKING SYSTEMS FOR RAILWAY CARS

(71) Applicant: Amsted Rail-Faiveley LLC, Greenville, SC (US)

(72) Inventor: Jonathan Sunde, Greenville, SC (US)

(73) Assignee: Amsted Rail Company, Inc., Chicago, IL (US)

( * ) Notice: Subject to any disclaimer, the term of this patent is extended or adjusted under 35 U.S.C. 154(b) by 154 days.

(21) Appl. No.: 14/619,772

(22) Filed: Feb. 11, 2015

(65) Prior Publication Data

US 2016/0229429 A1    Aug. 11, 2016

(51) Int. Cl.
*B60T 7/12* (2006.01)
*B61H 15/00* (2006.01)
*B61H 13/36* (2006.01)
*F16D 49/14* (2006.01)
*F16D 65/56* (2006.01)

(52) U.S. Cl.
CPC ......... *B61H 15/0028* (2013.01); *B61H 13/36* (2013.01); *F16D 49/14* (2013.01); *F16D 65/56* (2013.01)

(58) Field of Classification Search
CPC ..... B61H 13/36; B61H 13/34; B61H 15/0028
USPC .................................................. 188/124, 54
See application file for complete search history.

(56) References Cited

U.S. PATENT DOCUMENTS

| 1,340,168 A | 5/1920 | Huntoon |
| 1,405,665 A | 2/1922 | Burnett |
| 2,383,955 A | 9/1943 | Busse |
| 2,937,725 A | 5/1960 | Newell |
| 3,378,108 A | 4/1968 | McClure et al. |
| 3,412,830 A | 11/1968 | Bushnell |

(Continued)

FOREIGN PATENT DOCUMENTS

| EP | 1074450 A2 | 2/2001 |
| EP | 1428739 A1 | 6/2004 |

(Continued)

OTHER PUBLICATIONS

Amsted Rail-Faiveley LLC, International Patent Application No. PCT/US2016/017094; International Search Report; dated Apr. 11, 2016; 2 pages.

(Continued)

*Primary Examiner* — Anna Momper
*Assistant Examiner* — Mahbubur Rashid
(74) *Attorney, Agent, or Firm* — Dority & Manning, P.A.

(57) ABSTRACT

Braking systems for railway cars are provided. A braking system defines a longitudinal axis, and includes a first brake assembly, a second brake assembly, and an actuator operable to generate a linear force, the actuator disposed proximate the second brake assembly. The braking system further includes a movable rod and a fixed rod extending between the first brake assembly and the second brake assembly. In some embodiments, the braking system further includes a lever and a slack adjuster disposed proximate the first brake assembly, the slack adjuster connected to the first brake assembly and the lever and operable to adjust a distance along the longitudinal axis between a reference point of the first brake assembly and a pivot point of the lever. In some embodiments, the braking system includes a strut connected to the second brake assembly, the actuator, fixed rod and movable rod connected to the strut.

21 Claims, 19 Drawing Sheets

(56) References Cited

U.S. PATENT DOCUMENTS

| | | |
|---|---|---|
| 3,499,507 A | 3/1970 | Scott et al. |
| 3,731,766 A * | 5/1973 | Campbell .............. B61H 13/24 |
| | | 188/202 |
| 3,737,012 A | 6/1973 | Haydu |
| 4,258,830 A | 3/1981 | Pearson et al. |
| 4,593,797 A | 6/1986 | Schmitt |
| 4,613,016 A | 9/1986 | Hart et al. |
| 4,646,882 A | 3/1987 | Holloway et al. |
| 4,662,485 A | 5/1987 | Kanjo et al. |
| RE32,729 E | 8/1988 | Schmitt |
| 4,771,868 A | 9/1988 | Haydu |
| 4,793,446 A | 12/1988 | Hart et al. |
| 4,830,148 A | 5/1989 | Hart et al. |
| 5,000,298 A | 3/1991 | Jackson et al. |
| 5,069,312 A | 12/1991 | Kanjo et al. |
| 5,259,485 A | 11/1993 | Jackson |
| 5,400,874 A | 3/1995 | Gayfer et al. |
| 5,456,337 A | 10/1995 | Jackson |
| 5,495,921 A | 3/1996 | Samulak et al. |
| 5,785,159 A | 7/1998 | Jackson et al. |
| 5,810,124 A | 9/1998 | Sandmann |
| 6,116,385 A | 9/2000 | Ring |
| 6,148,966 A | 11/2000 | Daugherty, Jr. et al. |
| 6,279,696 B1 | 8/2001 | Daugherty, Jr. et al. |
| 6,397,979 B1 | 6/2002 | Samulak et al. |
| 6,443,270 B1 | 9/2002 | Hodge |
| 6,702,073 B2 | 3/2004 | Sommerfeld |
| 6,971,488 B1 | 12/2005 | Ring et al. |
| 7,216,940 B2 | 5/2007 | Sommerfeld |
| 7,341,128 B2 | 3/2008 | Ring et al. |
| 7,472,775 B2 | 1/2009 | Tuten |
| 7,527,131 B1 | 5/2009 | Wike |
| 7,802,662 B2 | 9/2010 | Sommerfeld et al. |
| 7,931,130 B2 * | 4/2011 | Ring ..................... B61H 13/36 |
| | | 188/124 |
| 8,978,841 B2 * | 3/2015 | Ring ..................... B61H 13/24 |
| | | 188/124 |
| 2004/0190979 A1 | 9/2004 | De La Fuente-Farias |
| 2006/0219502 A1 | 10/2006 | De La Fuente-Farias |
| 2007/0023241 A1 | 2/2007 | Ring |
| 2007/0209886 A1 | 9/2007 | Tuten |
| 2008/0035432 A1 | 2/2008 | Ring |
| 2011/0147140 A1 | 6/2011 | Ring |
| 2011/0253492 A1 | 10/2011 | De La Fuente-Farias |
| 2013/0118845 A1 | 5/2013 | De La Fuente-Farias |
| 2014/0174318 A1 | 6/2014 | Reese et al. |
| 2015/0014102 A1 | 1/2015 | Koziol |
| 2015/0321681 A1 | 11/2015 | Sunde |

FOREIGN PATENT DOCUMENTS

| | | |
|---|---|---|
| WO | WO 2004/089717 A1 | 10/2004 |
| WO | WP 2014/200974 A1 | 12/2014 |

OTHER PUBLICATIONS

Amsted Rail-Faiveley LLC; PowerPoint Presentation; Dec. 16, 2015 (17 pages).

Amsted Rail-Faiveley LLC; International Patent Application No. PCT/US2016/017097; International Search Report; dated Apr. 14, 2016 (2 pages).

* cited by examiner

BRAKING SYSTEMS FOR RAILWAY CARS

FIELD OF THE INVENTION

The present invention relates generally to braking systems for railway car, and more particularly to improved slack adjusters and struts for railway car braking systems.

BACKGROUND OF THE INVENTION

Railway cars are widely used for transportation of goods and passengers throughout the United States and abroad. Railway cars generally include one or more truck assemblies including a plurality of specially designed wheels for traveling along a vast infrastructure of railway tracks. Braking systems are generally disposed between adjacent pairs of wheels for facilitating the stopping or slowing down of the railway car.

A braking system can generally include front and rear brake assemblies, each including a pair of brake heads with brake pads for contact with an outer periphery of the wheels when the front and rear brake assemblies are moved away from one another. Commonly, an air cylinder is provided in the braking system for generating the force that causes such movement. The air cylinder or another actuator causes movement of a linkage system which is connected to and causes movement of the front and rear brake assemblies.

Many braking systems further include assemblies conventionally known as slack adjusters for adjusting the movement of the front and rear brake assemblies as required. In particular, slack adjusters compensate for brake pad wear by adjusting the movement of the front and rear brake assemblies based on changes in the distance that the brake heads must travel to contact the wheels. Typically, a slack adjuster is built into one of the rods in the linkage system. For example, such linkage systems can include two movable rods, one of which can include a slack adjuster, and two movable levers.

Improvements in slack adjuster and brake assembly design generally are, however, desired in the art. For example, improvements in the force transmission capabilities, robustness, and overall weight of brake assembly designs are generally desired.

BRIEF DESCRIPTION OF THE INVENTION

Aspects and advantages of the invention are set forth below in the following description, or may be obvious from the description, or may be learned through practice of the invention.

In accordance with one embodiment of the present disclosure, a braking system for a railway car is provided. The braking system defines a longitudinal axis, and includes a first brake assembly and a second brake assembly. The first brake assembly includes a bar assembly and a plurality of brake heads connected to the bar assembly. The bar assembly defines a reference point. The second brake assembly includes a bar assembly and a plurality of brake heads connected to the bar assembly. The braking system further includes an actuator operable to generate a linear force, the actuator disposed proximate the second brake assembly. The braking system further includes a movable rod extending between the first brake assembly and the second brake assembly, the movable rod coupled to the actuator and translatable along the longitudinal axis based on operation of the actuator, and a fixed rod extending between the first brake assembly and the second brake assembly. The braking system further includes a lever disposed proximate the first brake assembly, the lever including a first end, a second end, and a pivot point between the first end and the second end, the first end connected to the movable rod, the second end connected to the fixed rod. The braking system further includes a slack adjuster disposed proximate the first brake assembly, the slack adjuster connected to the first brake assembly and the lever and operable to adjust a distance along the longitudinal axis between the reference point and the pivot point.

In accordance with another embodiment of the present disclosure, a braking system for a railway car is provided. The braking system defines a longitudinal axis, and includes a first brake assembly and a second brake assembly. The first brake assembly includes a bar assembly and a plurality of brake heads connected to the bar assembly. The bar assembly includes a tension bar and a compression bar. A reference point is defined on the tension bar at a central point along a transverse axis. The second brake assembly includes a bar assembly and a plurality of brake heads connected to the bar assembly. The bar assembly includes a tension bar and a compression bar. The braking system further includes an actuator operable to generate a linear force, the actuator disposed between the tension bar and the compression bar of the second brake assembly. The braking system further includes a movable rod extending between the first brake assembly and the second brake assembly, the movable rod coupled to the actuator and translatable along the longitudinal axis based on operation of the actuator, and a fixed rod extending between the first brake assembly and the second brake assembly. The braking system further includes a lever disposed between the tension bar and the compression bar of the first brake assembly, the lever including a first end, a second end, and a pivot point between the first end and the second end, the first end connected to the movable rod, the second end connected to the fixed rod. The braking system further includes a slack adjuster disposed between the tension bar and the compression bar of the first brake assembly, the slack adjuster connected to the tension bar of the first brake assembly and the lever and operable to adjust a distance along the longitudinal axis between the reference point and the pivot point. Rotation of the first end about the pivot point within a first angle range causes no adjustment of the distance along the longitudinal axis between the reference point and the pivot point and rotation of the first end about the pivot point within a second angle range different from the first angle range causes adjustment of the distance along the longitudinal axis between the reference point and the pivot point.

In accordance with another embodiment of the present disclosure, a braking system for a railway car is provided. The braking system defines a longitudinal axis, and includes a first brake assembly and a second brake assembly. The first brake assembly includes a bar assembly and a plurality of brake heads connected to the bar assembly. The bar assembly includes a tension bar and a compression bar. The second brake assembly includes a bar assembly and a plurality of brake beads connected to the bar assembly. The bar assembly includes a tension bar and a compression bar. The braking system further includes an actuator operable to generate a linear force, the actuator disposed between the tension bar and the compression bar of the second brake assembly. The braking system further includes a movable rod extending between the first brake assembly and the second brake assembly, the movable rod coupled to the actuator and translatable along the longitudinal axis based on operation of the actuator, and a fixed rod extending between the first brake assembly and the second brake assembly. The braking system further includes a strut disposed between the tension bar and the compression bar of the second brake assembly, the strut comprising a base connected to the tension rod and an arm extending from the base and connected to the compression rod, wherein the actuator, fixed rod and movable rod are connected to the strut.

In accordance with another embodiment of the present disclosure, a strut for connecting a fixed rod, a movable rod and an actuator in a braking. System for a railway car is provided. The strut includes a base extending between a first end and a second end, a flange extending from the first end of the base, the flange connectable to the actuator, and an arm extending from the second end of the base, the arm extending between a first end connected to the second end of the base and a second free end. The strut further includes a pocket defined in the arm, the pocket sized to receive the fixed rod therein, and a passage defined in the second free end of the arm, the passage sized to receive the movable rod therethrough.

Those of skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
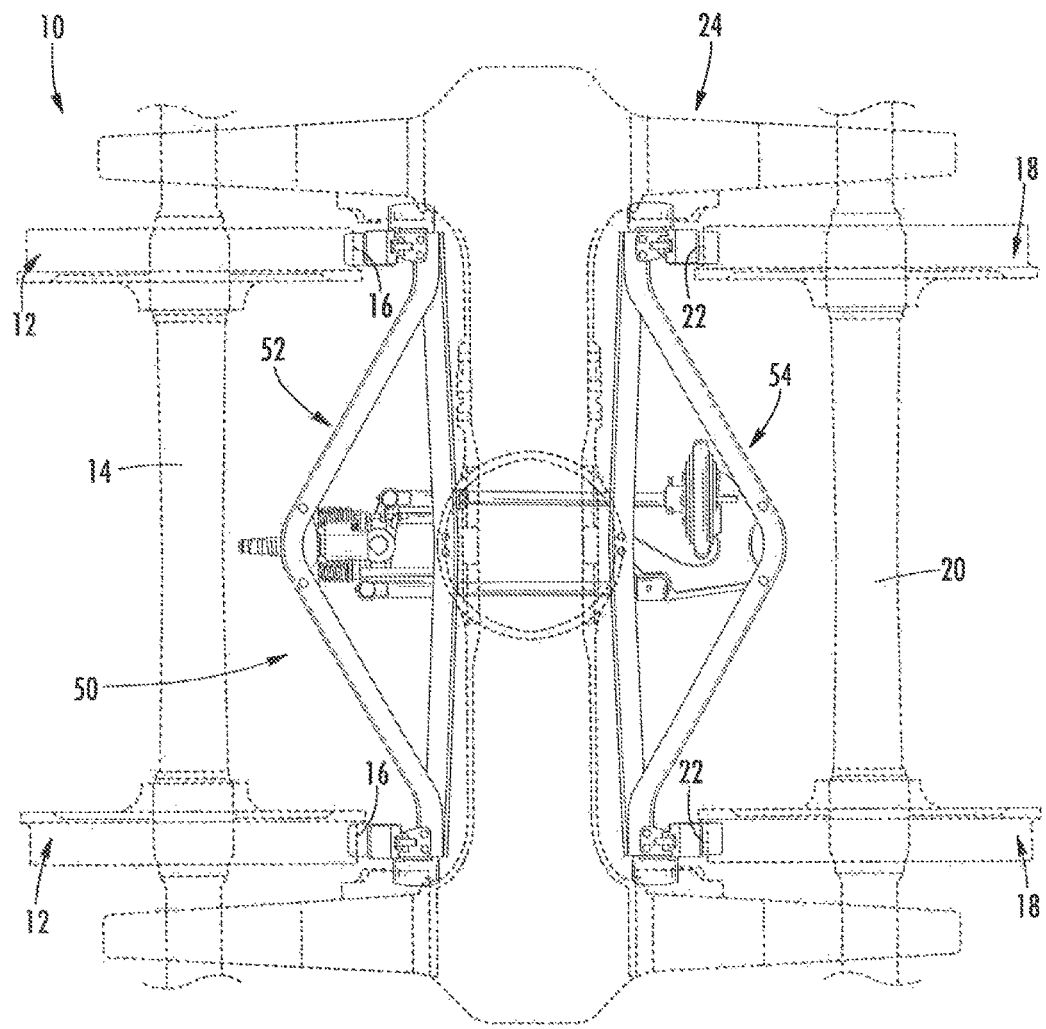
FIG. 1 is an overhead view of portions of an exemplary railway car truck (shown in phantom) having a braking system in accordance with one embodiment of the present disclosure installed therein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. Similarly, the terms "front" and "rear" may be used to describe certain components relative to one another, it being understood that the orientation of the components may be reversed depending for example on a traveling direction of the railway car. Further, the term "longitudinally" may for example refer to the relative direction substantially parallel to the traveling direction of a railway car, and "transverse" may refer for example to the relative direction substantially perpendicular to the traveling direction of the railway car.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, FIG. 1 provides a braking system 50 in accordance with an exemplary embodiment of the present disclosure, installed in an exemplary railway car truck 10 (shown in phantom). The railway car truck depicted in FIG. 1 generally includes a first axle 14 and a second axle 20, connected and supported by a chassis 24. The first axle 14 includes a pair of first wheels 12 rotatably mounted thereto and similarly, the second axle 20 includes a pair of second wheels 18 rotatably mounted thereto. The chassis 24 may support a portion of a railway car (not shown) and allow the truck 10 and railway car, using the first and second wheels 12, 18, to roll along a corresponding infrastructure of railway car tracks (not shown).

As will be discussed in greater detail below, the railway car truck 10 further includes an exemplary braking system 50, including a first brake assembly 52 and a second brake assembly 54, spaced from one another along a longitudinal axis L (see FIGS. 2-4). In certain exemplary embodiments, the first brake assembly 52 may correspond to a front brake assembly and the second brake assembly 54 may correspond to a rear brake assembly. Similarly, in certain exemplary embodiments, the first and second axles 14, 20 of the truck 10 may correspond to front and rear axles, and the first and second wheels 12, 18 may correspond to front and rear wheels. The braking system 50 is configured to generate friction between an outer periphery 16, 22 of the first and second wheels 12, 18, respectively, to slow and/or stop the railway car truck 10.

Figure 2:
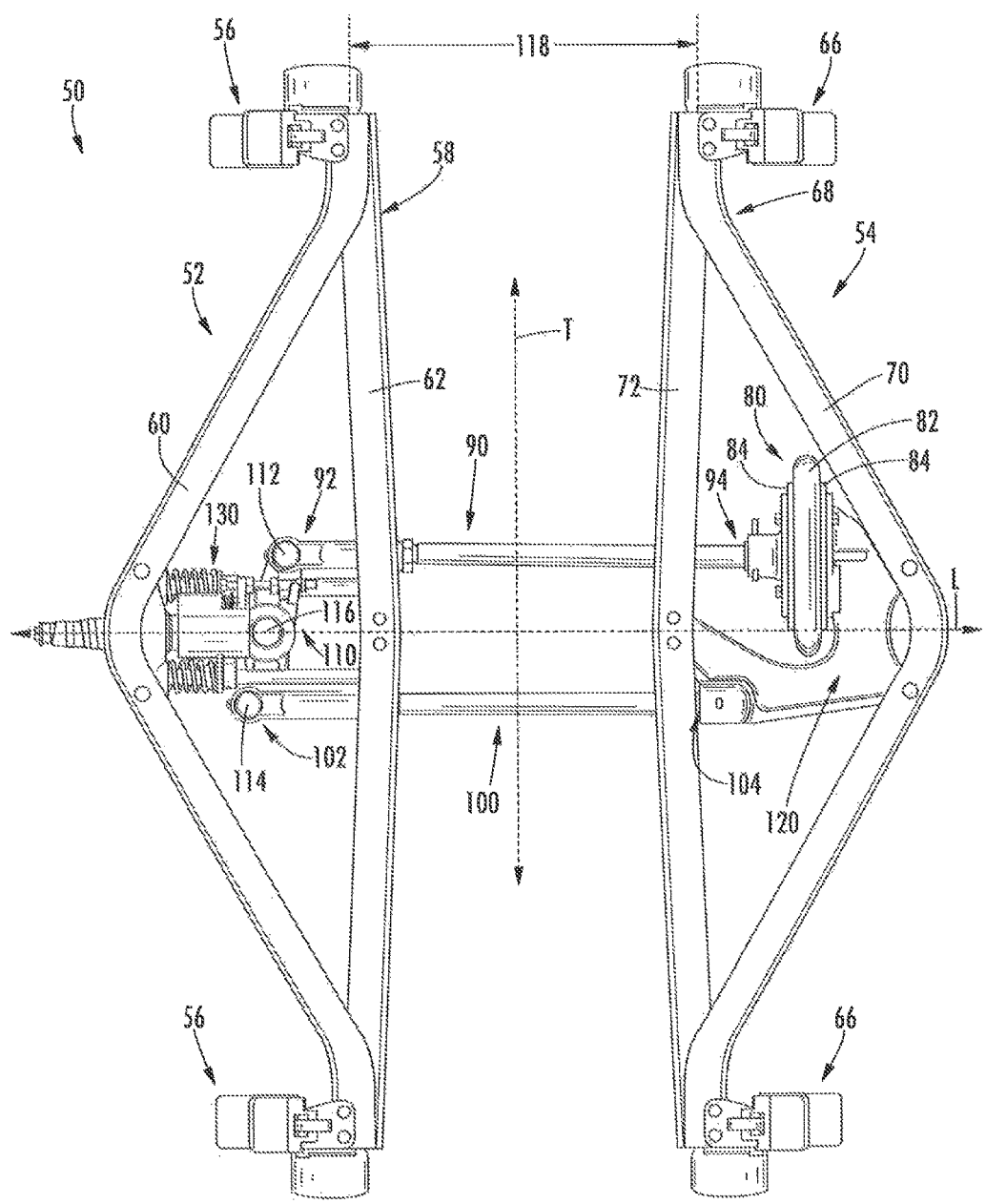
FIG. 2 is an overhead view of the exemplary braking system depicted in FIG. 1 in an non-deployed position.
Figure 3:
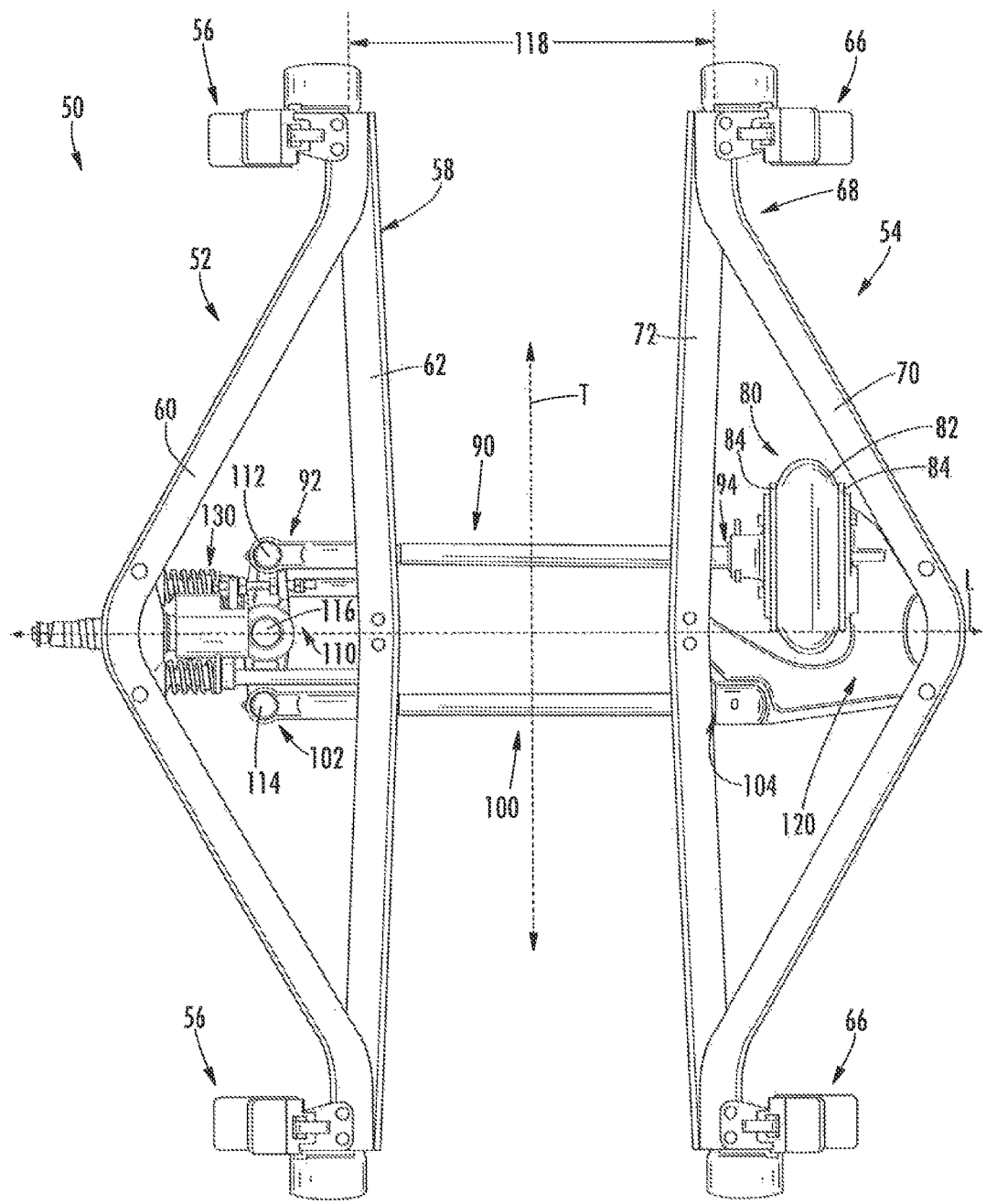
FIG. 3 is an overhead view of the exemplary braking system depicted in FIG. 1 in a deployed position with a slack adjuster of the braking system not actuated.
Figure 4:
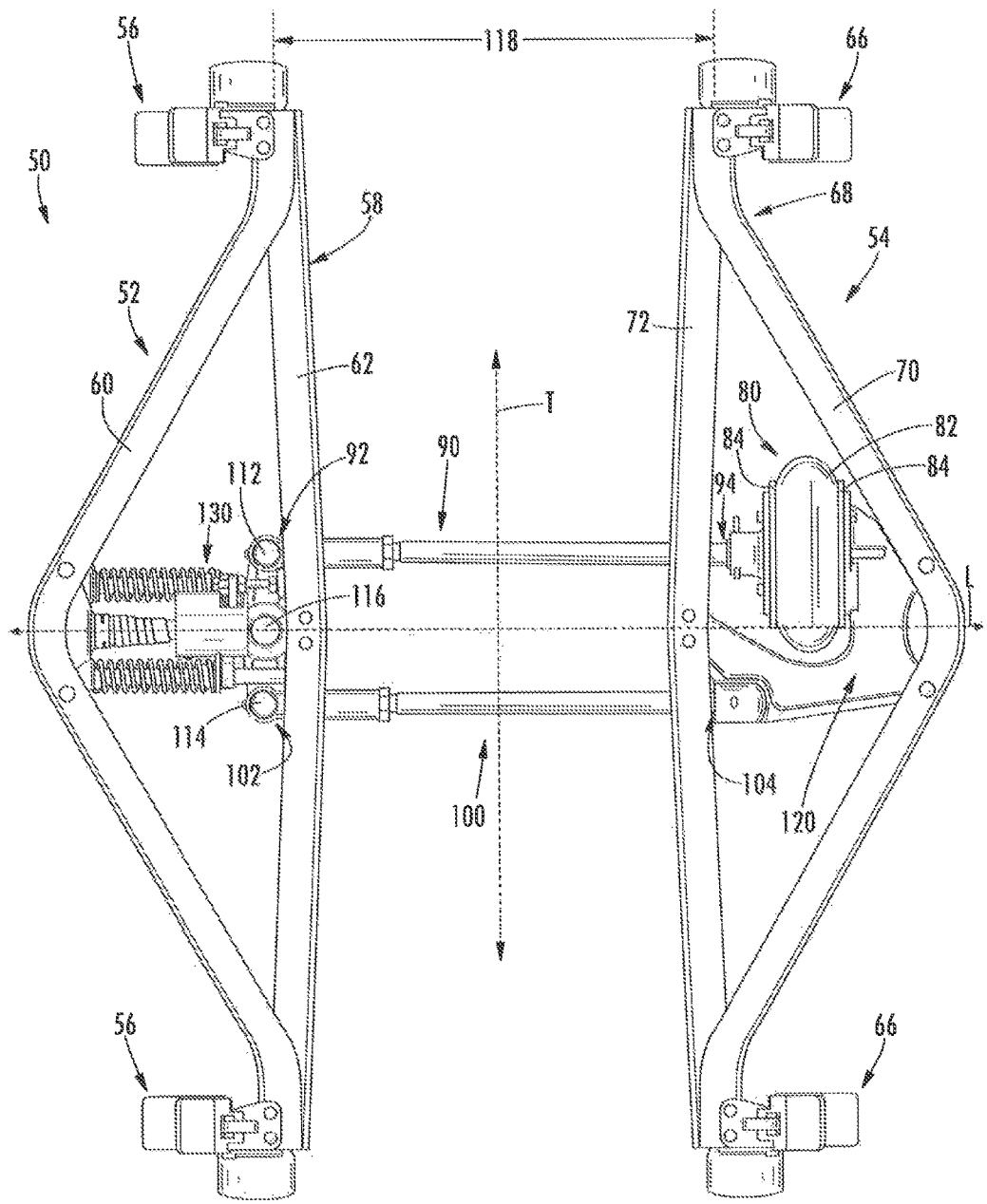
FIG. 4 is an overhead view of the exemplary braking system depicted in FIG. 1 in a deployed position after actuation of a slack adjuster of the braking system.

Referring now to FIGS. 2-4, the exemplary braking system 50 of FIG. 1 will be described in greater detail. The first brake assembly 52 includes a plurality of brake heads 56, such as a pair of brake heads 56 as shown, disposed at transverse ends (along transverse axis T) of the first brake assembly 52. The brake heads 56 each include one or more brake pads (not shown) defining a thickness and configured to contact an outer periphery 16 of the first wheels 12 (see FIG. 1). First brake assembly 52 further includes a bar assembly 58, which can for example include a tension bar 60 and a compression bar 62 each extending between the brake heads 56.

As with the first brake assembly 52, the second brake assembly 54 similarly includes a plurality of brake heads 66, such as a pair of brake heads 66 as shown, disposed at transverse ends of the second brake assembly 54, each with one or more brake pads (not shown) defining a thickness and configured to contact an outer periphery 22 of the second wheels 18. Second brake assembly 54 further includes a bar assembly 68, which can for example include a tension bar 70 and a compression bar 72 each extending between the brake heads 66.

One having skill in the art will appreciate, however, that in other exemplary embodiments, the braking system 50 may have any other suitable configuration of first and second brake assemblies 52, 54. For example, in other exemplary embodiments, the brake heads 56, 66 may have any other suitable construction and may include any suitable number of brake pads. In still other embodiments, the brake assemblies 52, 54 may not include both the tension and/or compression bars, and additionally, or alternatively, may include any other suitable bar members and/or configurations of structural components.

Referring still to FIGS. 2-4, the braking system 50 slows and/or stops the railway car truck 10 (see FIG. 1) by applying a divergent braking force between and to the first and second brake assemblies 52, 54, or more particularly, through the brake assemblies 52, 54 to the respective brake heads 56, 66 and brake pads. For the exemplary braking system 50 depicted in FIGS. 2-4, this force originates with an actuator 80 which, when actuated, provides a force which is transmitted to and through the first and second brake assemblies 52, 54. In general, actuator 80 is operable to generate a linear force which is transmitted to and through the first and second brake assemblies 52, 54. As illustrated, the linear force may be generated along the longitudinal axis L. In exemplary embodiments, as illustrated, the actuator 80 may be an inflatable air bag. Alternatively, however, the actuator 80 may be a brake cylinder, such as an air powered cylinder, hydraulic cylinder, or electric cylinder, or any other suitable actuator capable of generating a linear force.

Notably, in embodiments wherein the actuator 80 is an air bag, the actuator 80 can include a bladder 82 which is generally inflated and deflated when actuated as desired. The bladder 82 can be positioned between opposing plates 84, as shown, or rings. The plates 84 or rings are generally the components of the air bag that are connected to other components of the braking system 50 as discussed herein.

Actuator 80 may be disposed proximate the second brake assembly 54. For example, in exemplary embodiments as discussed, second brake assembly 54 may include a compression bar 72 and a tension bar 70. Actuator 80 may be disposed within the second brake assembly 54, such as in these embodiments between the compression bar 72 and the tension bar 70.

To facilitate transmission of the linear force generated by the actuator 80 to the brake assemblies 52, 54, a movable rod 90 may extend between the first and second brake assemblies 52, 54, such as along the longitudinal axis L. Movable rod 90 may be a rigid rod, formed for example from a suitable metal or other suitable material, which extends between a first end 92 and a second end 94. The movable rod 90, such as the second end 94 thereof, may be coupled to the actuator 80. For example, the movable rod 90 may be directly connected to the actuator 80 or indirectly connected to the actuator 80 via a strut as discussed herein. Accordingly, the movable rod 90 may be translatable along the longitudinal axis L based on operation of the actuator 80. Actuation of the actuator 80 thus causes translation of the movable rod 90 along the longitudinal axis L.

To further facilitate transmission of the linear force generated by the actuator 80 to the brake assemblies 52, 54, braking system 50 may further include a fixed rod 100. Similar to the movable rod 90, fixed rod 100 may extend between the first and second brake assemblies 52, 54, such as along the longitudinal axis L. Fixed rod 90 may be a rigid rod, formed for example from a suitable metal or other suitable material, which extends between a first end 102 and a second end 104. Fixed rod 100 may further be spaced apart from movable rod 90, such as along a transverse axis T. For example, fixed rod 100 and movable rod 90 may be positioned on opposite sides of a centerline of the braking system 50 defined by the longitudinal axis L. Notably, fixed rod 100 may remain generally stationary, and not translate, rotate, or otherwise significantly move, during operation of the braking system 50 as a result of actuation of the actuator 80. Thus, while movable rod 90 translates based on such actuation, fixed rod 100 does not.

A lever 110 may be provided in the braking system 50 to transmit the linear force from the actuator 80 and movable rod 90 to the brake assemblies 52, 54. In exemplary embodiments, lever 110 may be disposed proximate the first brake assembly 52 (generally opposite the actuator 80 along the longitudinal axis L). For example, in exemplary embodiments as discussed, first brake assembly 52 may include a compression bar 62 and a tension bar 60. Lever 110 may be disposed within the first brake assembly 52, such as in these embodiments between the compression bar 62 and the tension bar 60.

Lever 110 may include a first end 112, a second end 114, and a pivot point 116. Pivot point 116 is generally disposed between the first end 112 and the second end 114. Further, lever 110 may couple the rods 90, 100 together. For example, movable rod 90, such as the first end 92 thereof, may be connected to the first end 112 of the lever 110 (such as via a suitable mechanical connection, etc.). Fixed rod 100, such as the first end 102 thereof, may similarly be connected to the second end 114 of the lever 110.

Movement of the lever 110 based on actuation of the actuator 80 may generally cause movement of the brake assemblies 52, 54 to cause braking operations as discussed above. For example, and notably, actuation of the actuator 80 causes translation of the movable rod 90 but no movement of the fixed rod 100. Further, movable rod 90 and fixed rod 100 are both connected to the lever 110 at the ends 112, 114 of the lever 110. As a result, and as illustrated, translation of the movable rod 90 along the longitudinal axis L causes translation of the first end 112 and the pivot point 116 along the longitudinal axis L and rotation of the first end 112 and the pivot point 116 about the second end 114. Second end 114, due to the connection to the fixed rod 100, remains stationary. Such movement of the first end 112 and pivot point 116, however, generally causes a distance 118 along the longitudinal axis L between the first brake assembly 52 and the second brake assembly 54 to change, with an increase in the distance 118 resulting in contact with the wheels 12, 18 and resulting braking and a decrease in the distance 118 resulting in ceasing of contact and braking operations.

FIG. 2 illustrates the braking system 50 in an non-deployed position, with the actuator 80, in this case an air bag, not actuated. FIG. 3 illustrates the braking system 50 in a deployed position after actuation of the air bag.

To facilitate the movement of the first and second brake assemblies 52, 54 along the longitudinal axis L, the various components of the system 50 must be connected to the brake assemblies 52, 54. For example, braking system 50 may include a strut 120 which is disposed proximate the second brake assembly 54, such as between the tension bar 70 and the compression bar 72. Strut 120 may, for example, be connected to the second brake assembly 54, such as to the tension bar 70 and/or compression bar 72 as illustrated. Actuator 80 may be connected to the strut 120, and fixed rod 100, such as the second end 104 thereof, may further be connected to the strut 120. Accordingly, strut 120 may transfer braking force to the second brake assembly 54. Exemplary embodiments of strut 120 will be discussed in detail herein.

Braking system 50 may further include a slack adjuster 130. Slack adjuster 130 may be disposed proximate the first brake assembly 52, such as between the tension bar 60 and the compression bar 62. Slack adjuster 130 may, for example, be connected to the first brake assembly 52, such as to the tension bar 60 and/or compression bar 62 as illustrated. Further, and critically, the slack adjuster 130 may be connected to the lever 110, such as to the pivot point 116 as illustrated.

In addition to transmitting the braking force from the rods 90, 100 and lever 110 to the first brake assembly 52, slack adjuster 130 may additionally generally adjust the distance 118 to account for wear in the system 50, such as in the brake heads 56, 66 and specifically the pads thereof. For example, as mentioned, FIG. 3 illustrates the braking system 50 in a deployed position after actuation of the air bag. In FIG. 3, the slack adjuster 130 has not been actuated, because the brake heads 56, 66 generally contact the wheels 12, 18 when the lever 110 is rotated within a first angle range 132, as discussed herein. The first angle range 132 can generally be optimized on a system-by-system basis based on the optimal performance of the actuator 80 and other components of the system 50. After a period of use, however, the brake heads 56, 66, and specifically the brake pads thereof may wear, thus requiring the brake assemblies 52, 54 to travel further along the longitudinal direction L in order for the brake heads 56, 66 to contact the wheels 12, 18. Accordingly, lever 110 may be required to rotate within a second angle range 134 that is greater than the first angle range 132 for this contact to the made. However, the increased actuation that is required of the actuator 80 to cause this further rotation of the lever 110 may require that the actuator 80 operate outside of its peak performance range, thus causing non-optimal braking. Slack adjuster 130 may adjust the distance 118 to account for this situation, for example increasing the distance 118 such that lever 110 is only required to rotate within the first angle range 132 to facilitate braking despite the brake head 56, 66 wear, etc. FIG. 4, for example, illustrates the brake system 50 in the deployed position and after actuation of the slack adjuster 130, with distance 118 increased relative to FIG. 3 such that the brake heads 56, 66 again generally contact the wheels 12, 18 when the lever 110 is rotated within a first angle range 132.

Figure 5:
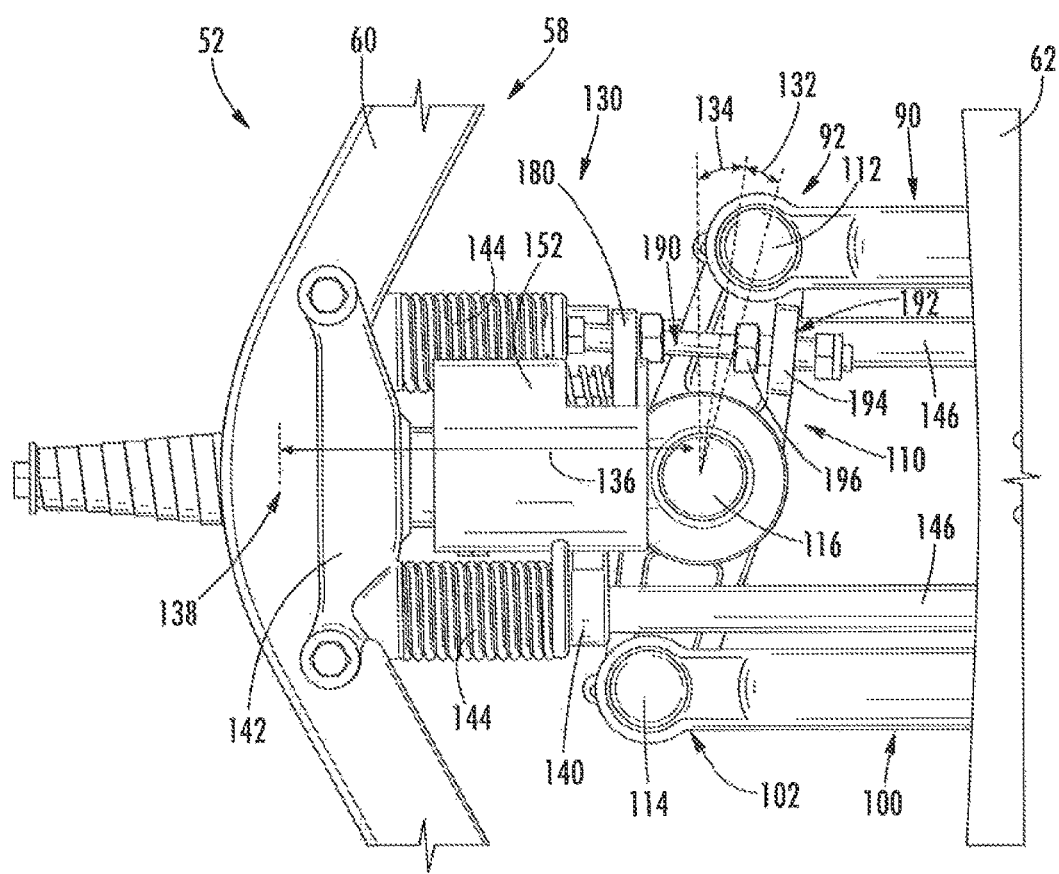
FIG. 5 is a close-up overhead view of a slack adjuster of a braking system with the braking system in an non-deployed position in accordance with one embodiment of the present disclosure.
Figure 6:
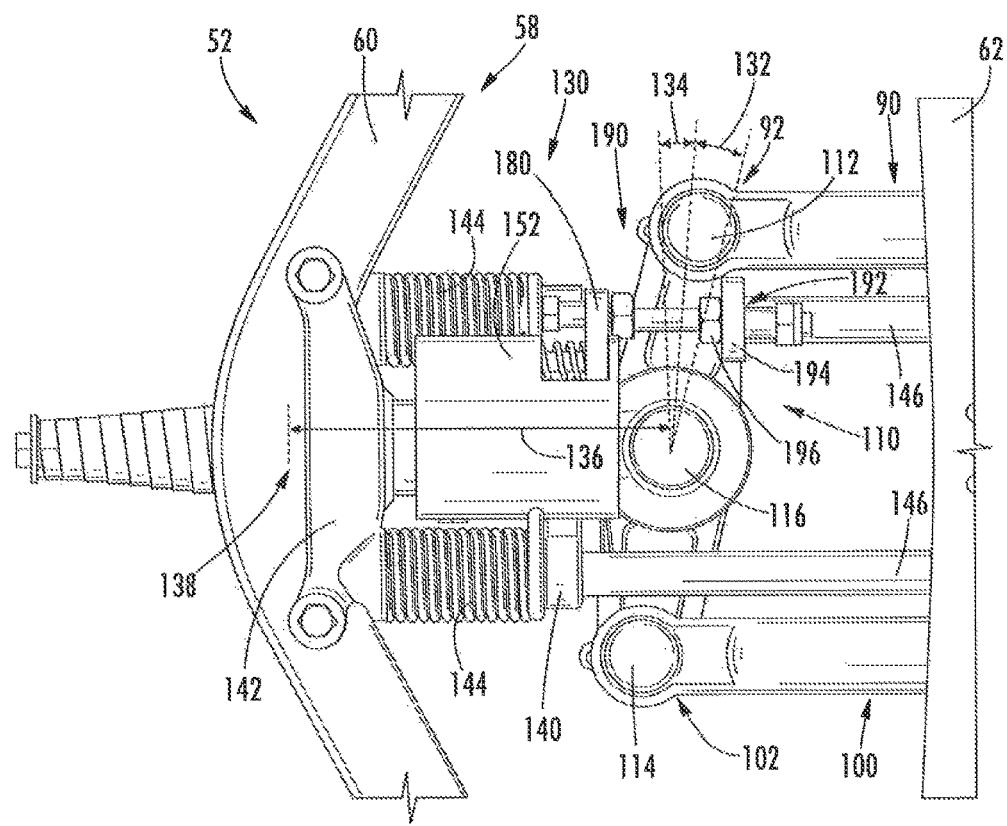
FIG. 6 is a close-up overhead view of the slack adjuster depicted in FIG. 5 with the braking system in a deployed position and the slack adjuster not actuated.
Figure 7:
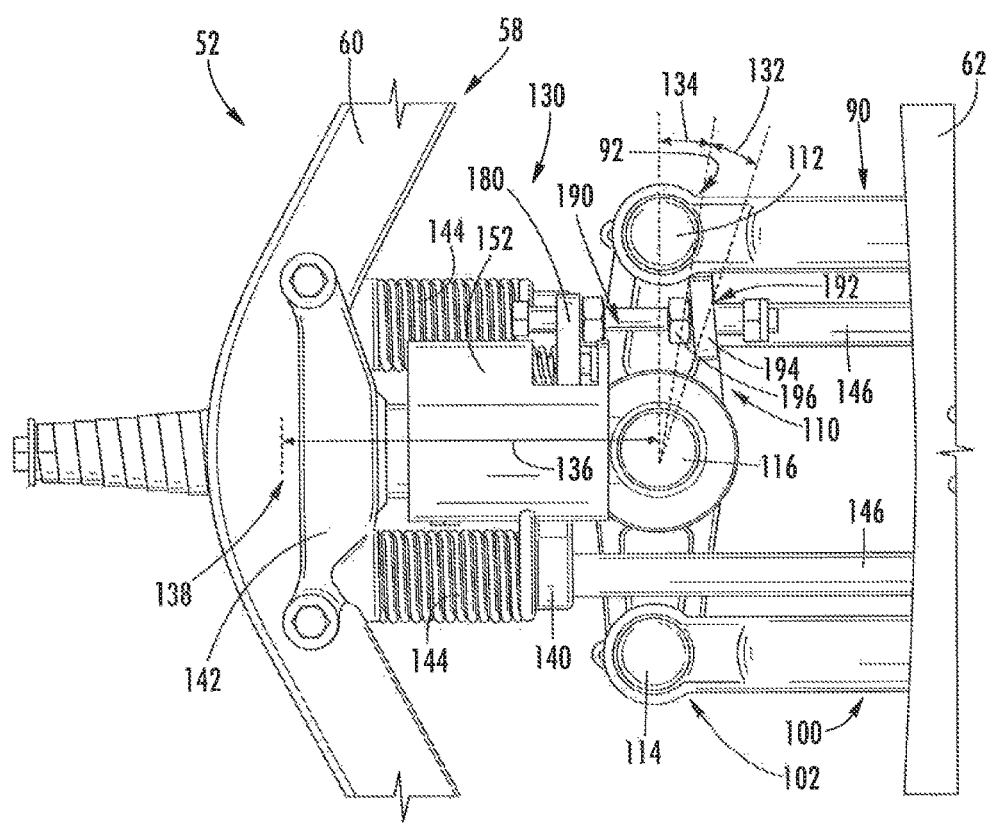
FIG. 7 is a close-up overhead view of the slack adjuster depicted in FIG. 5 with the braking system in a deployed position and the slack adjuster being actuated.
Figure 8:
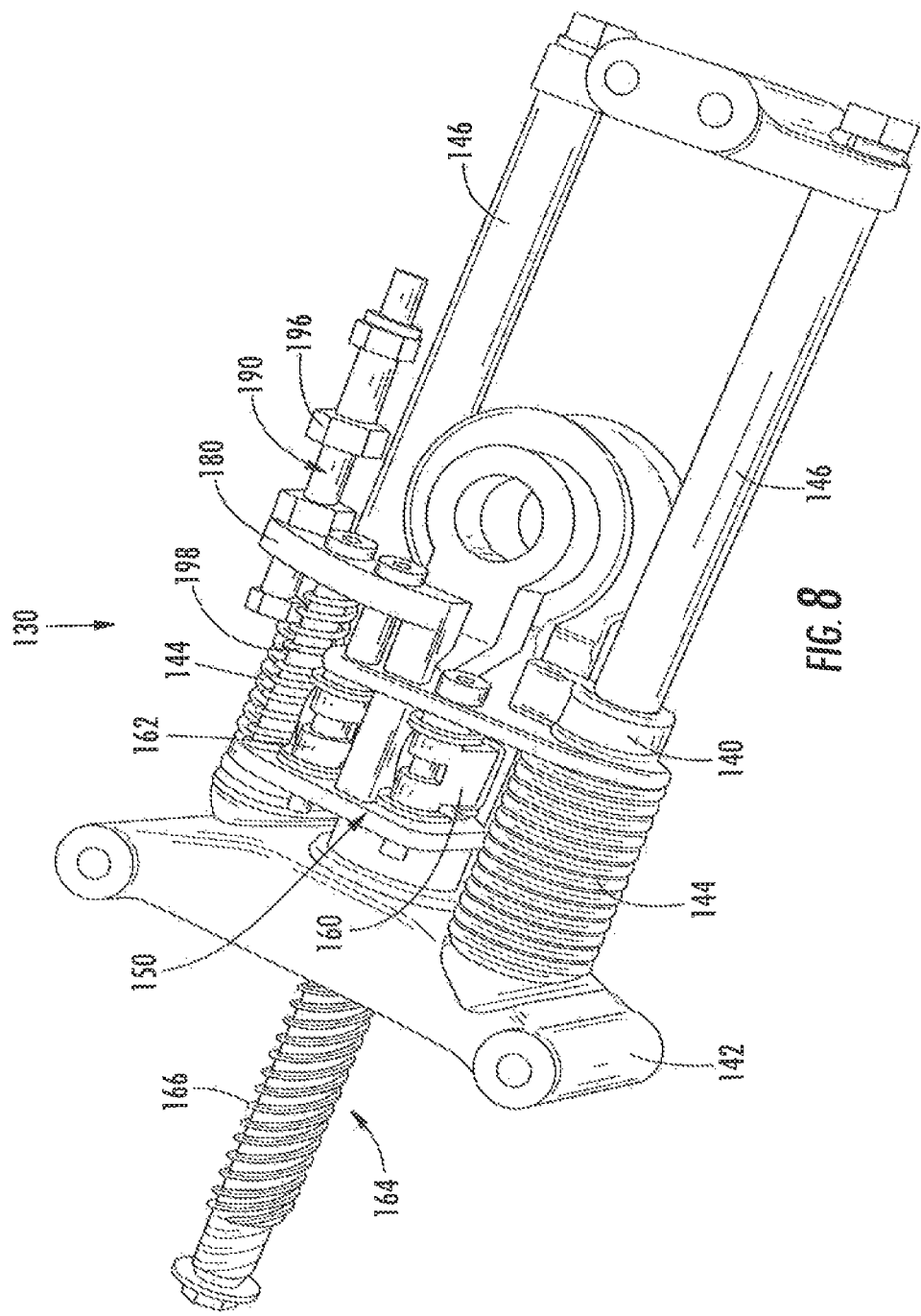
FIG. 8 is a close-up perspective view of a slack adjuster, with a cover removed, in accordance with one embodiment of the present disclosure.
Figure 9:
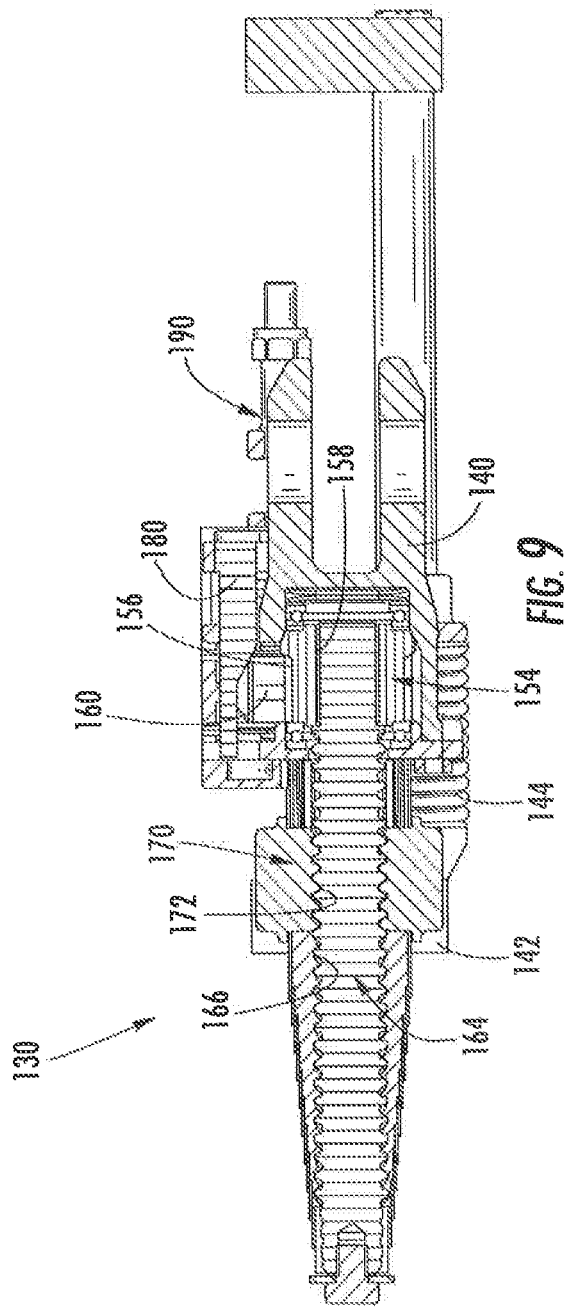
FIG. 9 is a side cross-sectional view of a slack adjuster in accordance with one embodiment of the present disclosure.
Figure 10:
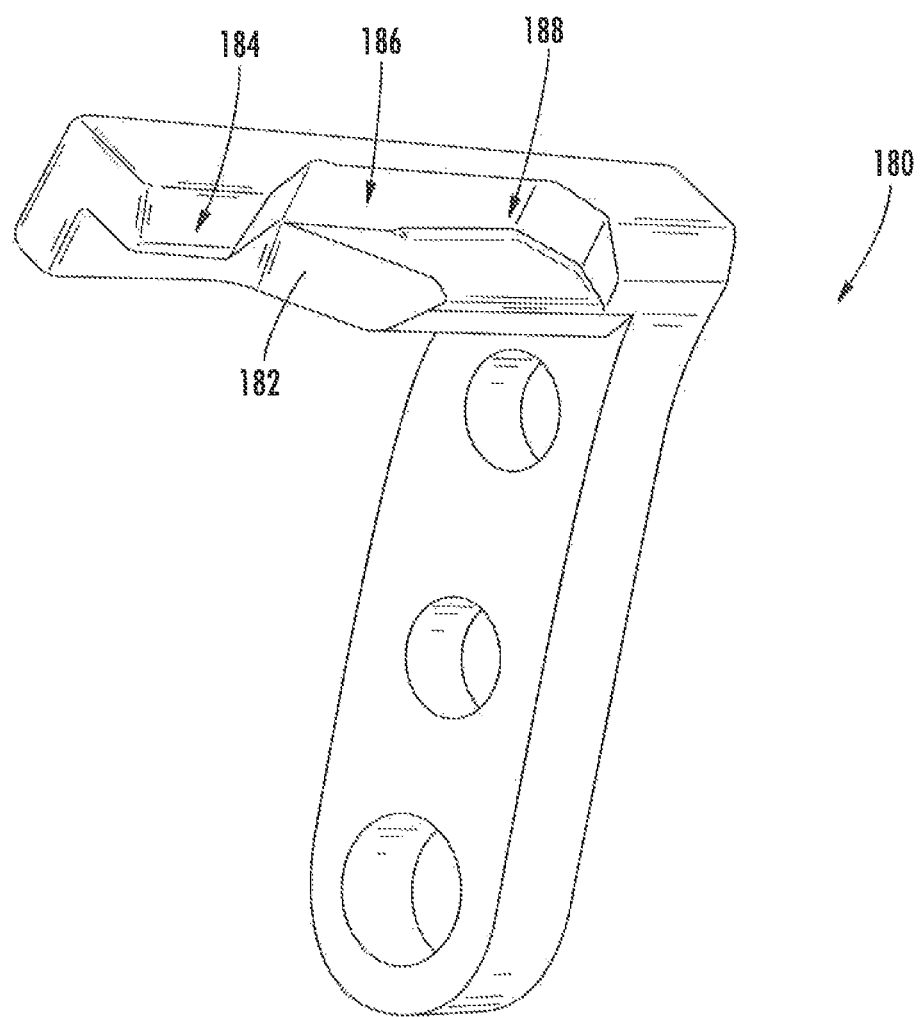
FIG. 10 is a perspective view of a camming bar of a slack adjuster in accordance with one embodiment of the present disclosure.

Specifically, in the embodiments shown, slack adjuster 130 is advantageously operable to adjust a distance 136 along the longitudinal axis L between a reference point 138 and the pivot point 116. Reference point 138 is defined by and on the bar assembly 59 of the first brake assembly 52. For example, reference point 138 can be defined on the tension bar 60 or the compression bar 62. In the embodiments illustrated, reference point 138 is defined as a central point along the transverse axis T on the tension bar 60. Referring briefly to FIGS. 5 through 7, for example, rotation of the first end 112 about the pivot point 114 within first angle range 132 causes no adjustment of the distance 136 along the longitudinal axis L between the reference point 138 and the pivot point 114. Rotation of the first end 112 about the pivot point 114 within second angle range 134, which is different from and in exemplary embodiments greater than the first angle range 132 causes adjustment of the distance 136 along the longitudinal axis L between the reference point 138 and the pivot point 114. FIG. 5 illustrates slack adjuster 130 in a non-deployed position, with braking system 50 generally also in a non-deployed position. FIG. 6 illustrated braking system 50 actuated to a deployed position, with slack adjuster 130 in a non-deployed position. As illustrated, because first end 112 is within first angle range 132, the slack adjuster 130 has not been actuated. FIG. 7 illustrated braking system 50 actuated to a deployed position, with slack adjuster 130 being actuated due to rotation of the first end 112 into the second angle range 134. Referring again to FIG. 4, slack adjuster 130 is illustrated after actuation, in the deployed position.

The location and operation of slack adjusters 130 as disclosed herein provides numerous advantages. For example, the positioning of the slack adjuster 130 allows both a fixed rod 100 to be utilized, and allows both the fixed rod 100 and movable rod 90 to be rigid rods with no adjustable components (as opposed to previously known systems 50 which would, for example, include slack adjusters in one of the rods). This contributes to the robustness and improved force transmission of brake systems 50 of the present disclosure. Further, slack adjusters 130 positioned in accordance with the present disclosure may advantageously be relative compact may advantageously decrease the weight of the associated system 50.

Referring now to FIGS. 5 through 13, embodiments of slack adjusters 130 in accordance with the present disclosure will be described in detail. It should be understood, however, that any slack adjuster 130 which is operable to adjust a distance 136 along the longitudinal axis L between a reference point 138 and a pivot point 116 is within the scope and spirit of the present disclosure.

As illustrated, a slack adjuster 130 in accordance with the present disclosure may include a first body 140 connected to the lever 110 at the pivot point 116, and a second body 142 connected to the bar assembly 59. For example, as shown, second body 142 may be connected to the tension bar 60. First body 140 may be translatable relative to the second body 142 along the longitudinal axis L. Further, in exemplary embodiments as illustrated and due to the connections of the first and second bodies 140, 142 as shown, translation of the first body 140 relative to the second body 142 along the longitudinal axis L may adjust the distance 136 along the longitudinal axis L between the reference point 138 and the pivot point 116.

Slack adjuster 130 may further include one or more springs 144 (which may for example be compression springs or other suitable biasing members). Each spring 144 may be operable to bias the first body 140 along the longitudinal axis L, such as relative to (and in exemplary embodiments away from) the second body 142. For example, in embodiments wherein springs 144 are compression springs, the springs 144 may be compressed when the slack adjuster 130 is not deployed. As discussed herein, springs 144 may be held in the compressed position by a ratchet assembly or other suitable actuatable component of the slack adjuster 130. When the slack adjuster 130 is actuated, the springs 144 may be released, and the outward bias of the springs 144 may force the first body 140 away from the second body 142 along the longitudinal axis L, thus deploying the slack adjuster 130.

As shown, slack adjuster 130 may include one or more guide rails 146. The guide rails 146 may extend from the second body 142. First body 140 may be movable connected to the guide rails 146, and may be translatable along the guide rails 146. Further, a spring 144 may be associated with a guide rail 146. For example, a spring 144 may generally surround a guide rail 146 as illustrated. Accordingly, guide rails 146 may generally guide the travel of the springs 144 and the first body 140 relative to the second body 142.

As mentioned, slack adjuster 130 may further include, for example, a ratchet assembly 150. Ratchet assembly 150 may generally be operable to cause translation of the first body 140 relative to the second body 142. For example, as discussed, rotation of the first end 112 about the pivot point 114 within first angle range 132 causes no actuation of the slack adjuster 130, and thus no adjustment of the distance 136 along the longitudinal axis L between the reference point 138 and the pivot point 114. Rotation of the first end 112 about the pivot point 114 within second angle range 134 causes actuation and deployment of the slack adjuster 130, and thus adjustment of the distance 136 along the longitudinal axis L between the reference point 138 and the pivot point 114. Ratchet assembly 150 may be actuatable to release the springs 144 and cause movement of the first body 140 as discussed above, thus causing actuation and deployment of the slack adjuster 130. FIGS. 8 through 13 illustrate embodiments and components of ratchet assemblies 150 in accordance with the present disclosure, in FIG. 8, a cover 152 of the ratchet assembly 150 has been removed for ease of viewing other components of the ratchet assembly 150.

As illustrated, ratchet assembly 150 can include a rotatable nut 154 and one or more pawls engageable with the nut 154. For example, a first pawl 160 and a second pawl 162 may each be engageable with a plurality of external teeth 156 of the nut 154. Further, a screw rod 164 may be connected, such as threadably connected, to the nut 154. For example, external threads 166 of the screw rod 164 may be threadably connected to internal threads 158 of the rotatable nut 154. Additionally, screw rod 164 may be connected, such as threadably connected, to a fixed nut 170. For example, the external threads 166 may be threadably connected to internal threads 172 of the fixed nut 170. Fixed nut 170 may, for example, be connected to or housed within the second body 142.

Referring briefly to FIGS. 9 and 11 through 13, the pawls 160, 162 may each be rotated between an engaged position wherein the pawl 160, 162 is contacting the plurality of external teeth 156 and a disengaged position wherein the pawl 160, 162 is spaced from the plurality of external teeth 156. When a pawl 160, 162 contacts the external teeth 156, this contact generally prevents rotation of the nut 154, and thus the connected screw rod 164, in a particular direction. Further, when two pawls 160, 162 are utilized as illustrated, the pawls 160, 162 may be positioned such that contact with the external teeth 156 by the first pawl 160 generally prevents rotation of the nut 154 in a first direction and contact with the external teeth 156 by the second pawl 162 generally prevents rotation of the net 154 in a second opposite direction. The first direction may, for example, be the direction of rotation that the nut 154 and screw rod 164 rotate in as the first body 140 translates away from the second body 142, and the second direction may, for example, be the direction of rotation that the nut 154 and screw rod 164 rotate in as the first body 140 translates towards the second body 142. Such rotation is caused in the first direction by the spring bias and the interaction between the screw rod 164 and fixed nut 170, and this rotation causes translation of the screw rod 164 and rotatable nut 154 with the first body 140 and relative to the fixed nut 170 and second body 142. Rotation in the second opposite direction (and accompanying translation) can be caused manually by an operator resetting the slack adjuster 130, or can alternatively be caused by a suitable selectively actuatable or biasing component.

Figure 11:
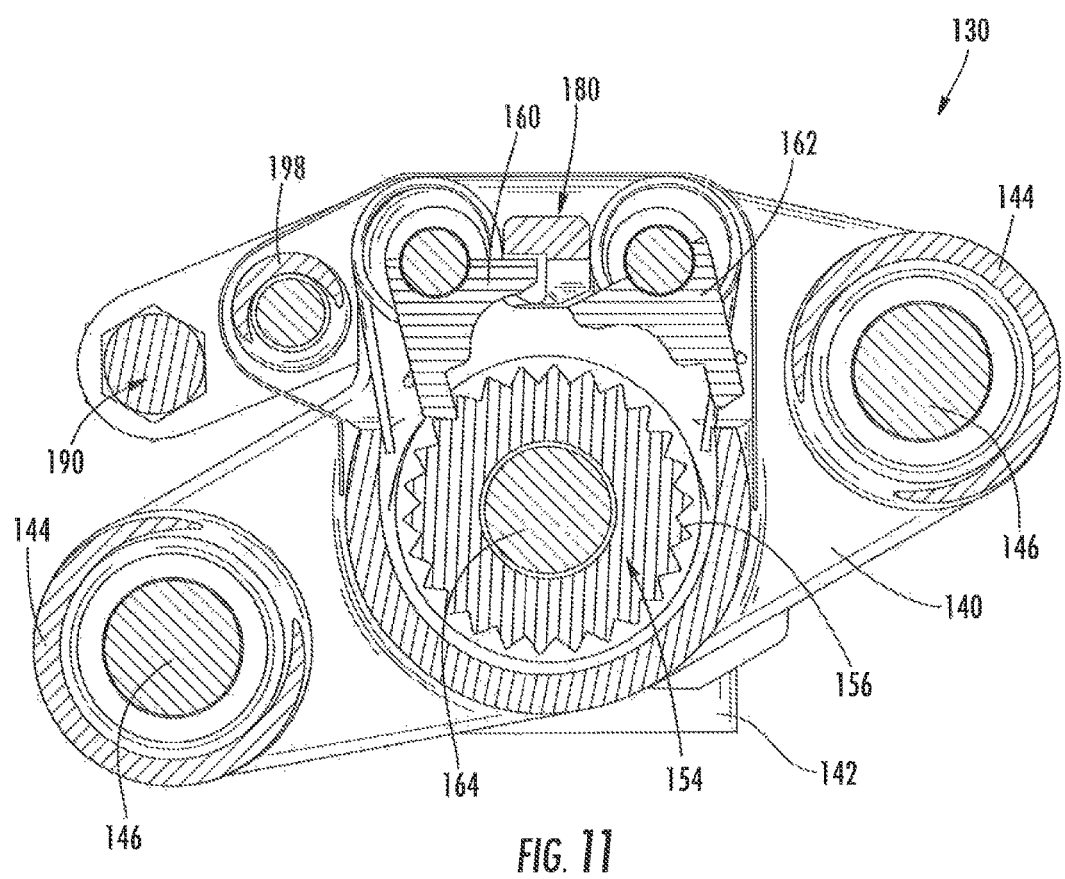
FIG. 11 is a front cross-sectional view of a slack adjuster in accordance with one embodiment of the present disclosure with pawls of the slack adjuster in a first position.
Figure 12:
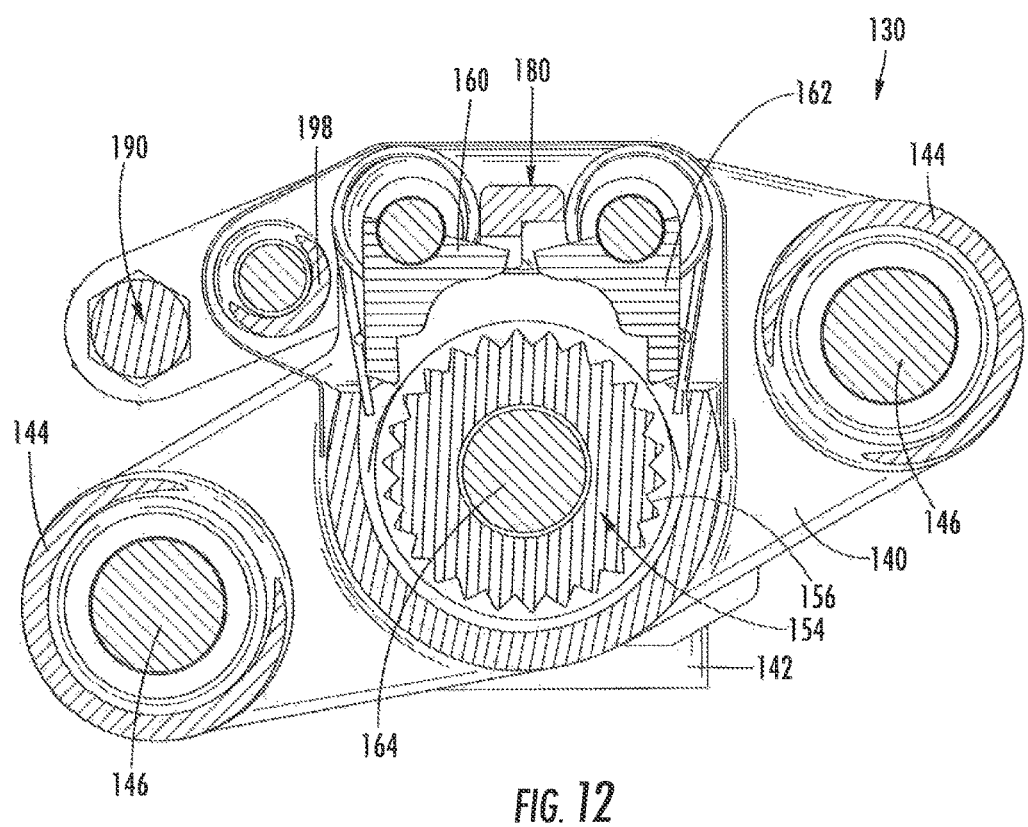
FIG. 12 is a front cross-sectional view of the slack adjuster depicted in FIG. 11 with pawls of the slack adjuster in a second position.
Figure 13:
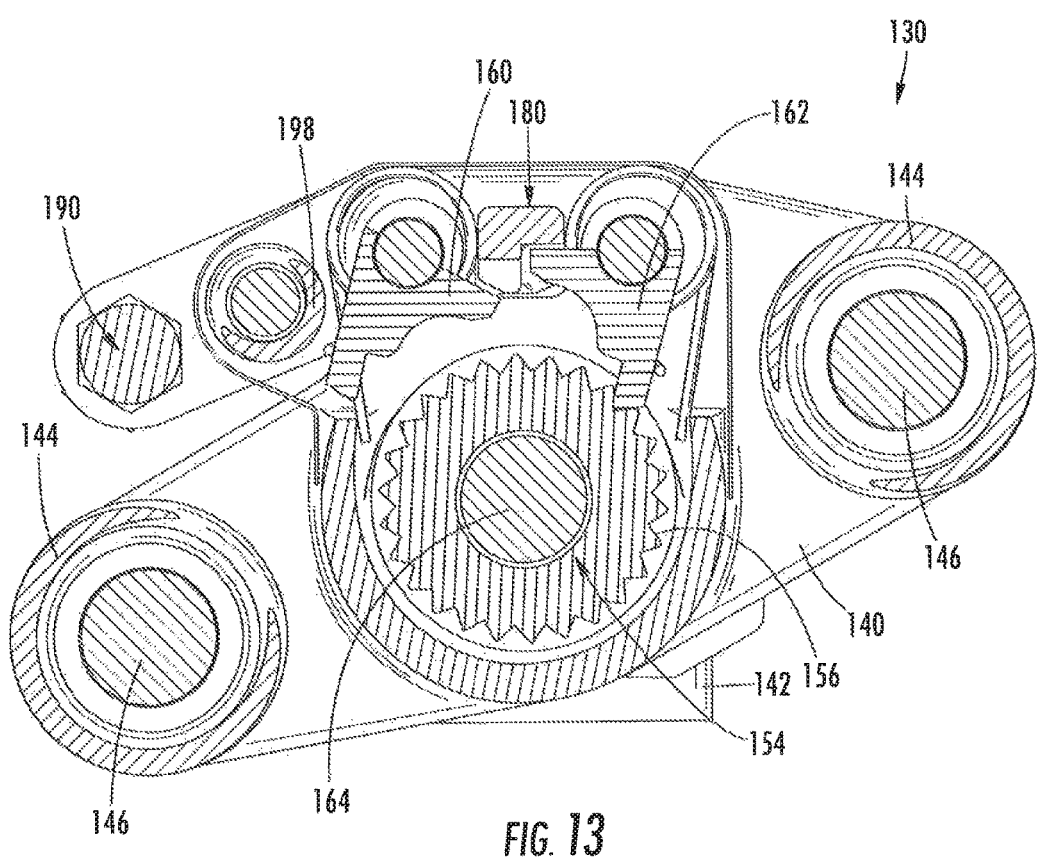
FIG. 13 is a front cross-sectional view of the slack adjuster depicted in FIG. 11 with pawls of the slack adjuster in a third position.
Figure 14:
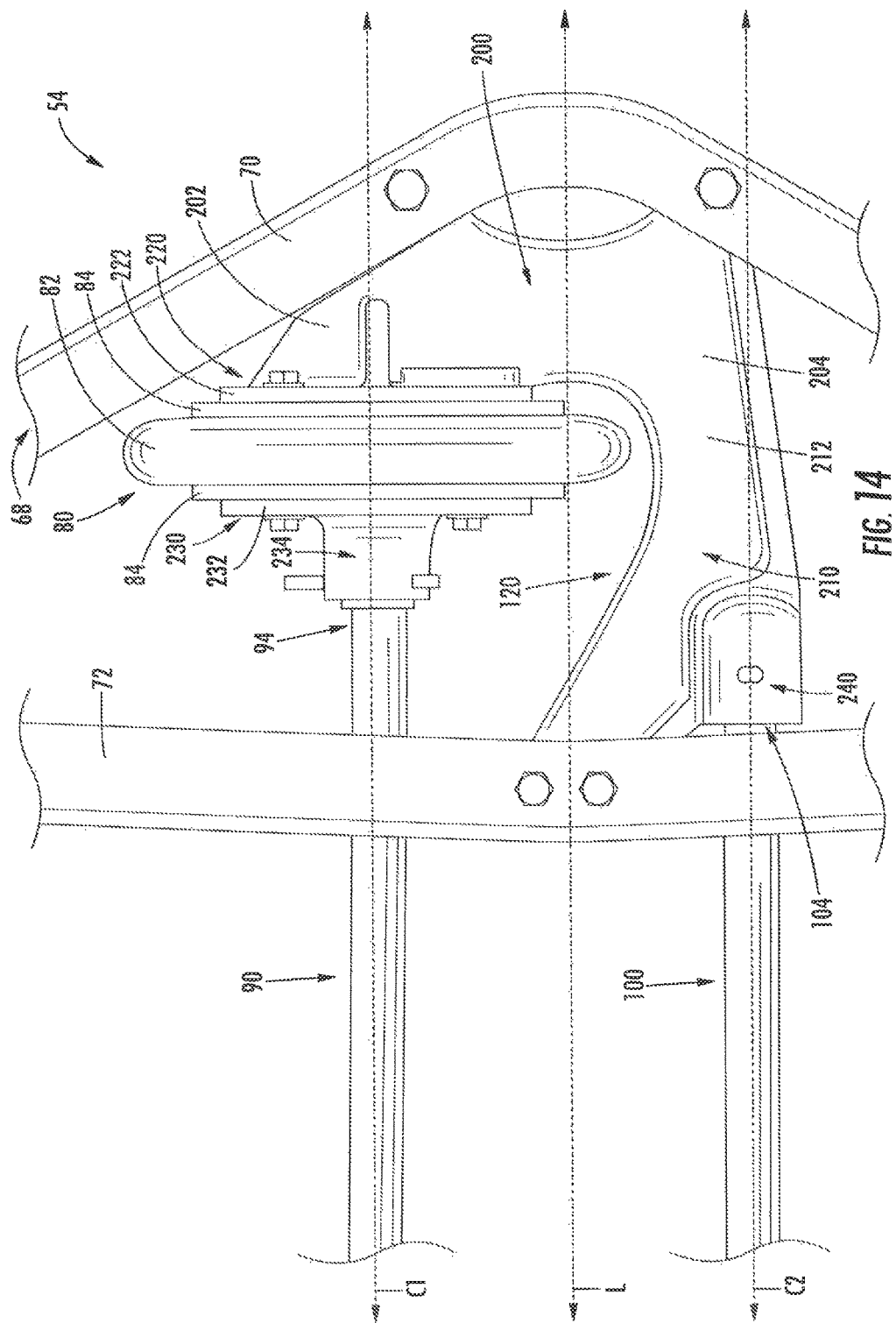
FIG. 14 is an overhead view of a strut shown within a braking system in accordance with one embodiment of the present disclosure.
Figure 15:
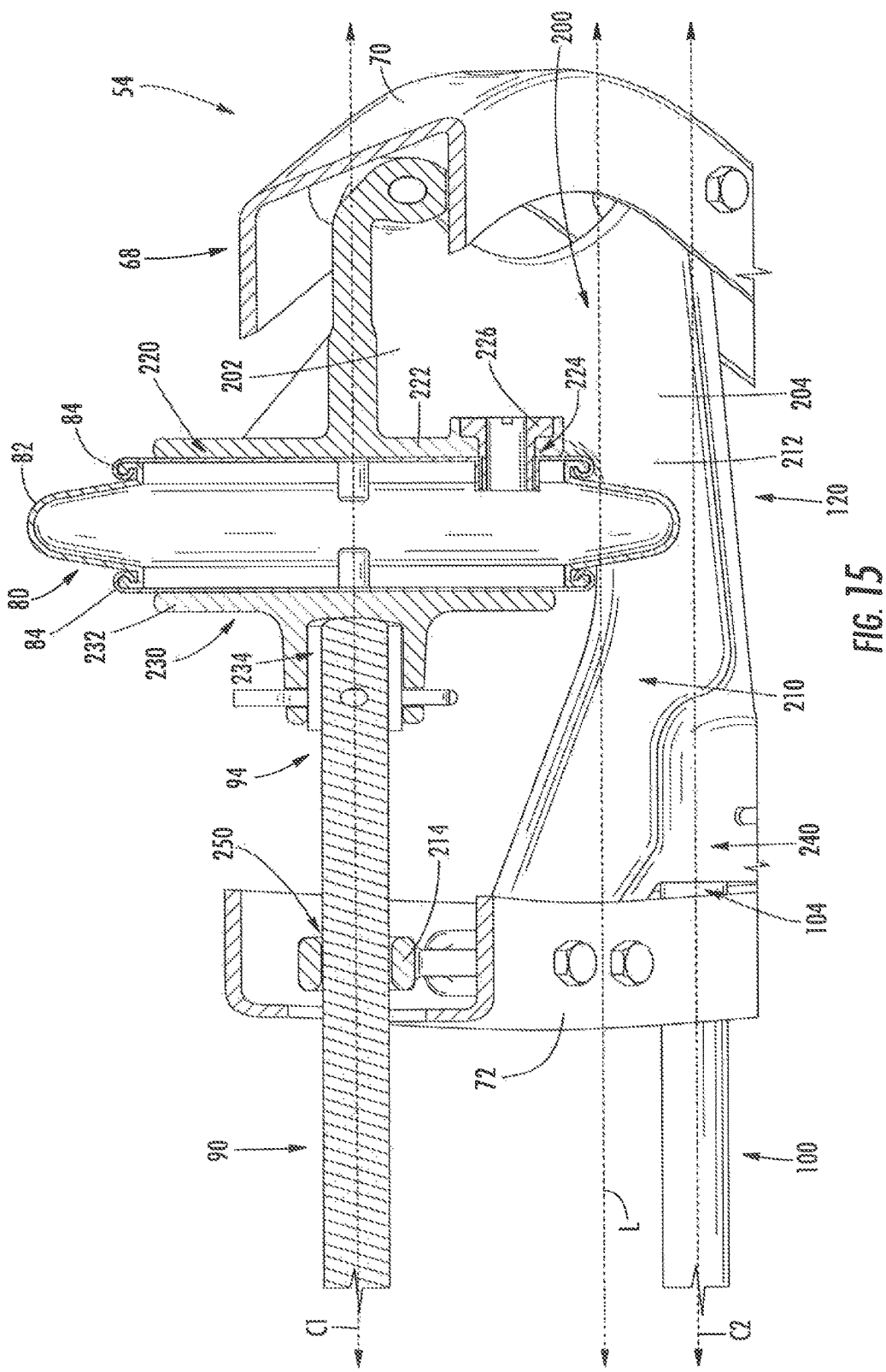
FIG. 15 is an overhead cross-sectional view of the strut depicted in FIG. 14.

FIG. 11 illustrates first pawl 160 in an engaged position and second pawl 162 in a disengaged position, in these positions, the ratchet assembly 150 prevents rotation of the screw rod 164 and rotatable nut 154 in a first direction and thus prevents translation of the first body 140 away from the second body. However, rotation of the screw rod 164 and rotatable nut 154 in a second direction and thus translation of the first body 140 towards the second body is allowed. FIG. 12 illustrates first pawl 160 in a disengaged position and second pawl 162 in a disengaged position. FIG. 13 illustrates first pawl 160 in a disengaged position and second pawl 162 in an engaged position. In both of these positions, the ratchet assembly 150 allows rotation of the screw rod 164 and rotatable nut 154 in a first direction and thus allows translation of the first body 140 away from the second body. In the positions of FIG. 12, the ratchet assembly 150 allows rotation of the screw rod 164 and rotatable nut 154 in a second direction and thus allows translation of the first body 140 towards the second body in the positions of FIG. 13, the ratchet assembly 150 prevents rotation of the screw rod 164 and rotatable nut 154 in a second direction and thus prevents translation of the first body 140 towards the second body.

Referring again generally to FIGS. 5 through 13, ratchet assembly 150 may further include a camming bar 180. The camming bar 180 may be operable to adjust the positions of the pawls 160, 162, and thus selectively allow translation of the first body 140 relative to the second body 142 as discussed above. For example, camming bar 180, such as a cam surface 182 thereof, may be in contact with the pawls 106, 162. With respect to the first pawl 160, camming bar 180 may be translatable between an engaged position wherein the pawl 160 is rotated into contact with one of the plurality of external teeth 156 and a disengaged position wherein the pawl 160 is rotated into a position spaced from the plurality of external teeth 156 interaction with the cam surface 182 may cause such rotation. With respect to the second pawl 162, camming bar 180 may be translatable between an engaged position wherein the pawl 162 is rotated into contact with one of the plurality of external teeth 156 and a disengaged position wherein the pawl 162 is rotated into a position spaced from the plurality of external teeth 156. Interaction with the cam surface 182 may cause such rotation. Cam surface 182 may, for example, include two or more portions, such as three portions as illustrated, which may each when in contact with the pawls 160, 162 rotate the pawls 160, 162 to the various positions. For example, first portion 184 may cause the first pawl 160 to be in contact with the teeth 156 and second pawl 162 to be spaced from the teeth 156, second portion 186 may cause the first pawl 160 to be spaced from the teeth 156 and second pawl 162 to be spaced from the teeth 156, and third portion 186 may cause the first pawl 160 to be spaced from the teeth 156 and second pawl 162 to be in contact with the teeth 156. With respect to the first pawl 160, camming bar 180 is in the engaged position when the first portion 184 contacts the pawl 160 and the disengaged position when the second or third portions 186, 188 contact the pawl 160. Accordingly, when the camming bar 180 is in the disengaged position with respect to the first pawl 160, the spring bias can cause the first body 140 to translate away from the second body 142. With respect to the second pawl 162, camming bar 180 is in the engaged position when the third portion 188 contacts the pawl 162 and the disengaged position when the second or first portions 186, 184 contact the pawl 162.

As discussed, camming bar 180 can be translatable between various positions to facilitate operation of the slack adjuster 130 generally. This translation is generally based on rotation of the lever 110. For example, rotation of the first end 112 about the pivot point 114 within first angle range 132 can cause the camming bar 180 to remain in a position such that the first pawl 160 is in an engaged position. Rotation of the first end 112 about the pivot point 114 within second angle range 134, however, can cause the camming bar 180 to translate to a position such that the first pawl 160 is in a disengaged position. In some embodiments as illustrated, ratchet assembly 150 can further include a control rod 190, which can be coupled to the camming bar 180 and which can cause such translation of the camming bar 180. For example, translation of the control rod 90 can cause translation of the camming bar 180.

Referring specifically to FIGS. 5 through 7, one embodiment of the control rod 190 interaction with the camming bar 180 is provided. As illustrated, the control rod 190 may be coupled to the lever 110 at a coupling point 192, which may be between the first end 112 and the pivot point 116. For example, lever 110 may include a flange 194 through which control rod 190 may extend. During rotation of the first end 112 of the lever 110 about the pivot point 116 with the first angle range 132, the flange 194 and coupling point 192 may translate relative to the control 190, which may remain stationary in terms of translation. Accordingly, camming bar 180 may also remain stationary in terms of translation. During rotation of the first end 112 of the lever 110 about the pivot point 116 with the second angle range 134, the flange 194 and coupling point 192 may during translation encounter a stop 196 of the control rod 190, and thus due to contact with the stop 196 causes translation of the control rod 190 with the flange 194 and coupling point 192. Accordingly, camming bar 180 may translate, and the slack adjuster 130 may be actuated.

Additionally, ratchet assembly 150 may include a control spring 198. This spring may interact with the camming bar 180 and control rod 190 and may, as illustrated, provide a spring bias to the camming bar 180 and control rod 190, such as in the first direction of travel of the first body 140 away from the second body 142.

It should be understood that the present disclosure is not limited to the ratchet assemblies 150, slack adjusters 130, etc. described herein, and rather that any suitable components for adjusting the distances with braking systems 50 as discussed herein are within the scope and spirit of the present disclosure.

As discussed above, braking system 50 may include a strut 120. Referring now to FIGS. 14 through 19, embodiments of a strut 120 in accordance with the present disclosure are provided. The use of struts 120 in accordance with the present disclosure may provide the braking system 50 with various advantages. For example, strut 120 can provide generally even transmission of force to the second brake assembly 54 (about the longitudinal axis), and can linearly orient the rods to facilitate improved force transmission and reduce bending moments, etc., on the rods 90, 100 caused by the linear force generated by the actuator 80.

As discussed, strut 120 can be disposed proximate the second brake assembly 54, such as between the tension bar 70 and the compression bar 72. Strut 120 may, for example, be connected to the second brake assembly 54, such as to the tension bar 70 and/or compression bar 72 as illustrated. Actuator 80 may be connected to the strut 120, and fixed rod 100 and movable rod 90, such as the second ends 104, 94 thereof, may further be connected to the strut 120.

In exemplary embodiments, as illustrated, strut 120 may include a base 200 and an arm 210 extending from the base 200. Base 200 may be connected to the tension bar 60, and arm 202 may be connected to the compression bar 62, as illustrated. Base 200 may extend between a first end 202 and a second end 204, and arm 210 may extend between a first end 212 and a second end 214. The first end 212 of the arm 210 may be connected to the base 200, and the second end 214 of the arm 210 may be a free end.

Figure 16:
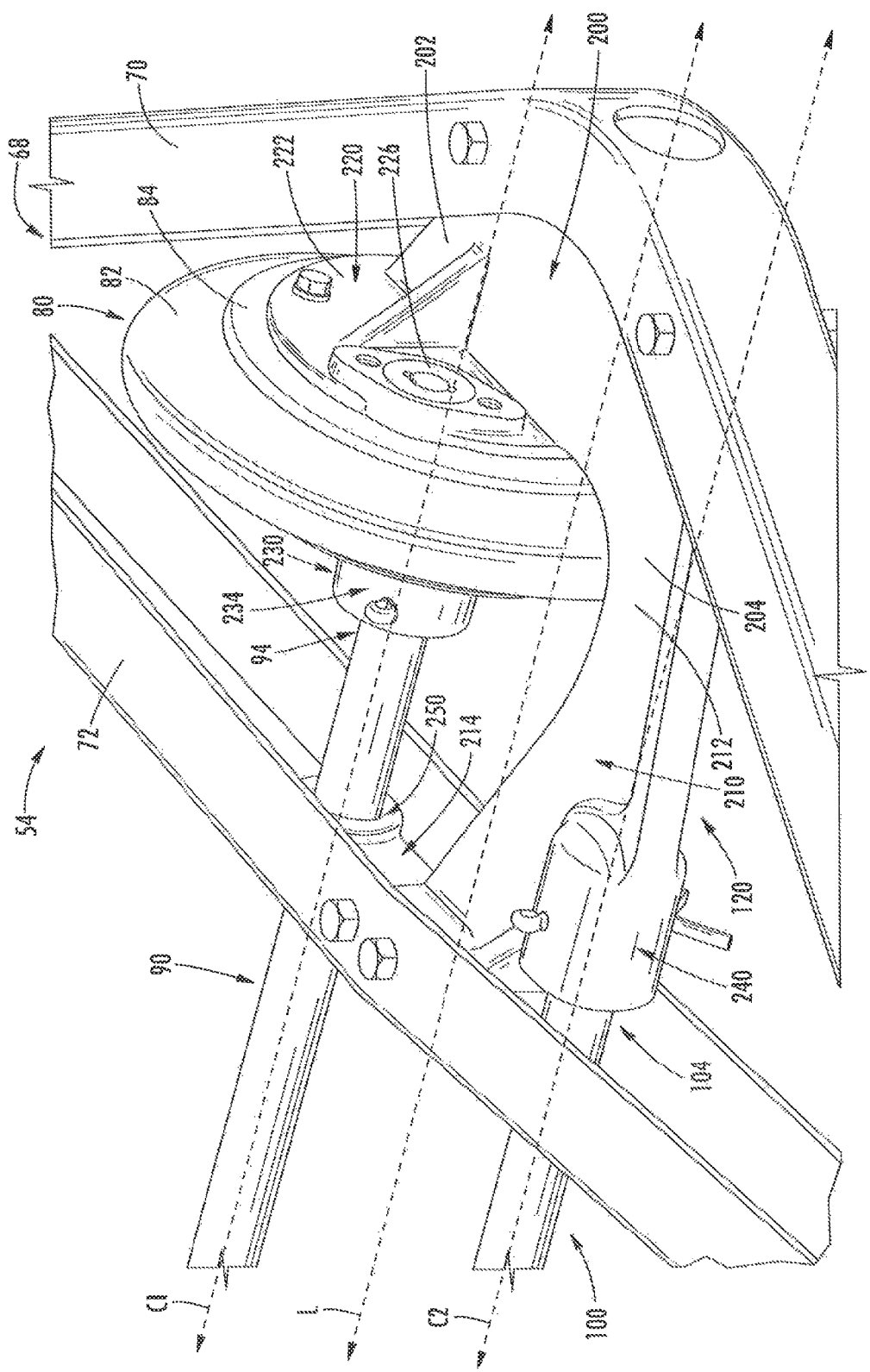
FIG. 16 is a perspective view of the strut depicted in FIG. 14.
Figure 17:
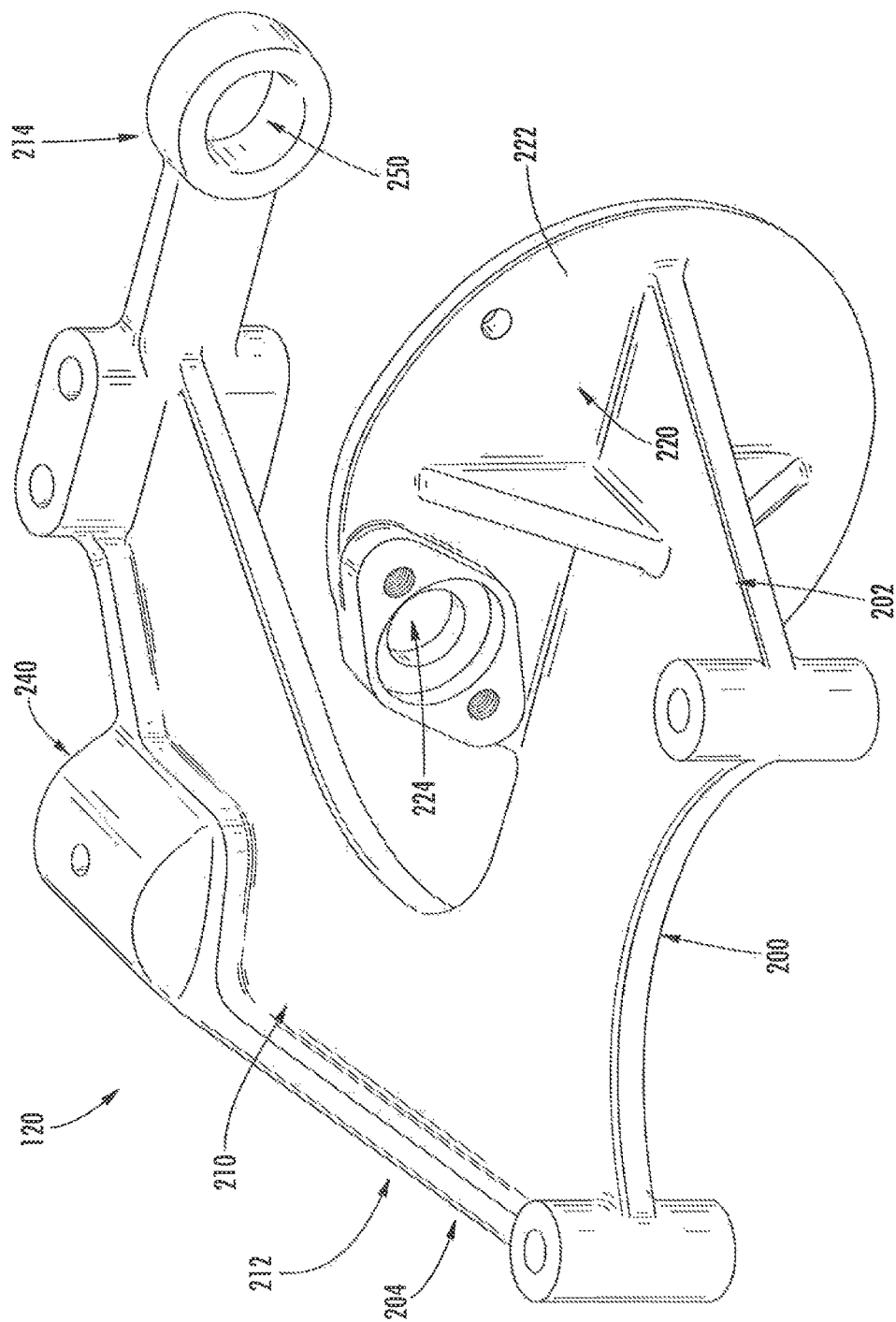
FIG. 17 is an isolated perspective view of a strut in accordance with one embodiment of the present disclosure.
Figure 18:
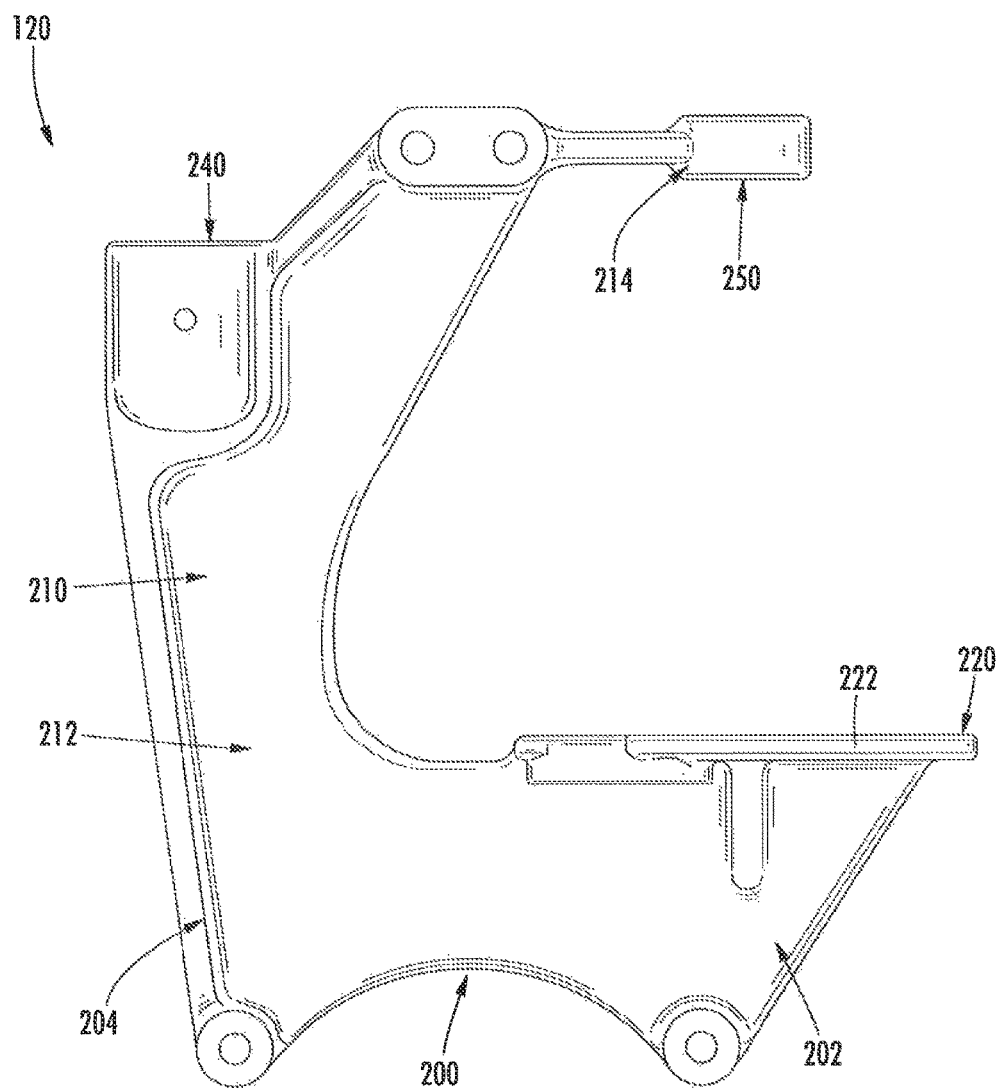
FIG. 18 is an isolated overhead view of the strut depicted in FIG. 17.
Figure 19:
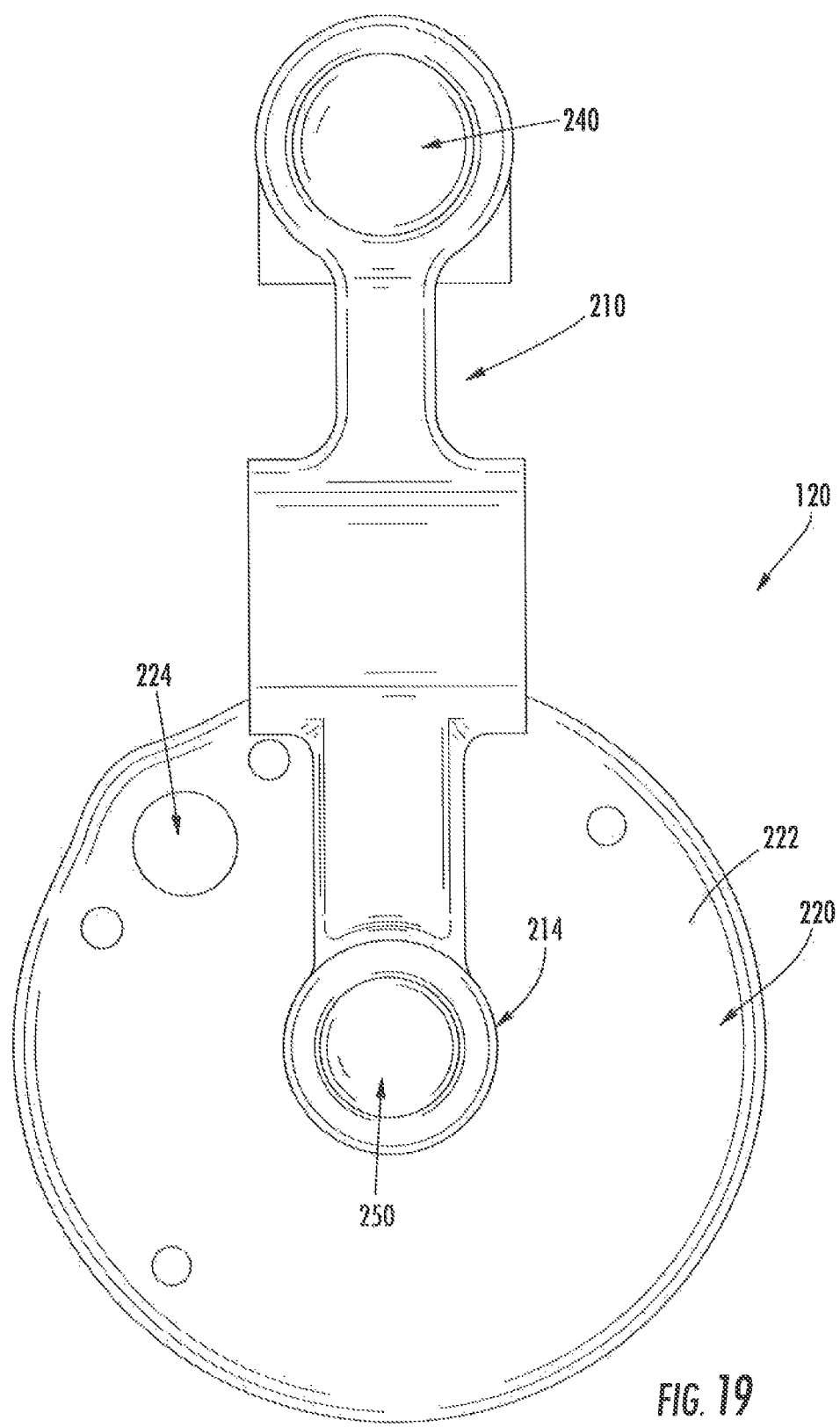
FIG. 19 is a front view of the strut depicted in FIG. 17.

A flange 220, such as a first flange, may further extend from and be connected to the base 200, such as the first end 202 thereof. The flange 220 may be connectable to the actuator 80 and, when assembled as illustrated, the actuator 80 may be connected to the flange 220. Notably, as illustrated in FIGS. 16, 17 and 19, the flange 220 may in exemplary embodiments define a first central longitudinal axis C1 which, when the braking system 50 is assembled, may be generally-parallel to the longitudinal axis L. In exemplary embodiments, the actuator 80 may be centrally aligned on the central longitudinal axis C1 such that the linear force generated by the actuator 80 is generated along the central longitudinal axis C1.

In exemplary embodiments as shown, flange 220 may include a body 222 and a passage 224 defined in and through the body 222. Passage 224 may allow for an actuation source, such as in the case of an air bag an air hose (not shown) to connect through the flange 220 to the actuator 80. Further, in exemplary embodiments, a connector flange 226 may be extendable and, when assembled, extended through the passage 224. The connector flange 224 may be connectable and, when assembled, connected to the actuator 80. The connection may be a threadable connection, with outer threads of the connector flange 224 meshing with inner threads of the actuator 80, as illustrated. The connector flange 224 may provide a connection between the actuation source and the actuator 80. Further, advantageously, the connector flange 224 may not be connected to the flange 220. Accordingly, force transmissions to the flange from the interaction between the actuation source and the actuator 80 may advantageously be reduced.

Strut 120 may further include a second flange 230, which may be separate from the base 200, arm 210, and first flange 220. Second flange 230 may similarly be connectable to the actuator 80 such that, when assembled as illustrated, the actuator 80 may be connected to the flange 230. Accordingly, actuator 80 may be connectable and, when assembled, connected between the first flange 220 and the second flange 230.

Second flange 230 may include a body 232 and a pocket 234 defined in the body 232. To connect the movable rod 90 to the strut 120, the second end 94 of the movable rod 90 may be, when assembled, disposed within the pocket 234. Accordingly, pocket 234 may be sized to receive the movable rod 90, such as the second end 94 thereof, therein. Further, advantageously, the pocket 234 may be centrally located on the body 232. In exemplary embodiments as illustrated the second flange 230 generally and/or the pocket 234 thereof may be centrally aligned on the central longitudinal axis C1. Accordingly, the linear force generated by the actuator 80 may be generated along the central longitudinal axis C1 centrally through the second flange 230 generally and/or the pocket 234 thereof. Movable rod 90 may further extend along the central longitudinal axis C1 and, because movable rod 90 is connected to the pocket 234 in these embodiments, the linear force can thus advantageously be transmitted linearly through the movable rod 90.

Strut 120 can further include, for example, a pocket 240 defined in the arm 210, such as between the first end 212 and the second end 214 of the arm 210. To connect the fixed rod 100 to the strut 120, the second end 104 of the fixed rod 100 may be, when assembled, disposed within the pocket 240. Accordingly, pocket 240 may be sized to receive the fixed rod 100, such as the second end 104 thereof, therein. Further, advantageously, the pocket 240 may defined a second central longitudinal axis C2 which may be parallel to the first central longitudinal axis C1 and, when the braking system 50 is assembled, may be generally parallel to the longitudinal axis L. Fixed rod 100 may further extend along the central longitudinal axis C2 and, because fixed rod 100 is connected to the pocket 240 in these embodiments, linear force can thus advantageously be transmitted linearly between the fixed rod 100 and the strut 120 generally.

Notably, in exemplary embodiments when the braking system 50 is assembled, the pockets 230, 240 and axes C1, C2 may be equally spaced along the transverse axis T from the longitudinal axis L. This advantageously facilitates generally even force transmission through the system 50 and brake assemblies 52, 54 thereof.

Strut 120 can further include a passage 250 defined in the arm 210. The passage 250 may be positioned for the movable rod 90 to extend through, and may thus be sized to receive the movable rod 90 therethrough. Further, passage 250 may be positioned and aligned along the first central longitudinal axis C1, as illustrated. For example, in exemplary embodiments, the passage 250 may be defined in the second end 214 of the arm 210. Accordingly, the movable rod 90 may extend through the passage 250 as it extends along the first central longitudinal axis C1. The passage 250 may thus advantageously support the movable rod 90 during braking operations and reduce bowing, etc. due to, for example, misalignments in components of the braking system 50 or other forces applied to the movable rod 90.

Notably, the base 200, arm 210, and flange 220 (as well as the pocket 240 and passage 250) are connected to form a main component of the strut 120. In exemplary embodiments, some or all of these components are integral and monolithic. The monolithic construction such that these components are formed as a single component advantageously increases the strength of the resulting strut. Notably, however, in exemplary embodiments, the second flange 230 is a separate component and is thus not directly connected or integral and monolithic with the base 200, arm 210, and flange 220 (as well as the pocket 240 and passage 250).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A braking system for a railway car, the braking system defining a longitudinal axis and comprising:
    a first brake assembly, the first brake assembly comprising a bar assembly and a plurality of brake heads connected to the bar assembly, the bar assembly comprising a tension bar and a compression bar;
    a second brake assembly spaced apart from the first brake assembly along the longitudinal axis, the second brake assembly comprising a bar assembly and a plurality of brake heads connected to the bar assembly, the bar assembly comprising a tension bar and a compression bar;
    an actuator operable to generate a linear force, the actuator disposed between the tension bar and the compression bar of the second brake assembly;
    a movable rod extending between the first brake assembly and the second brake assembly, the movable rod connected to the actuator and translatable along the longitudinal axis based on operation of the actuator;
    a fixed rod extending between the first brake assembly and the second brake assembly;
    a strut disposed between the tension bar and the compression bar of the second brake assembly, the strut comprising a base connected to the tension bar and an arm extending from the base and connected to the compression bar of the second brake assembly, wherein the actuator, the fixed rod and the movable rod are connected to the strut, and wherein a second end of the fixed rod is connected to the arm of the strut,
    wherein the strut further comprises a pocket defined in the arm, and wherein a second end of the fixed rod is disposed within the pocket.

2. The braking system of claim 1, wherein the strut further comprises a passage defined in the arm, and wherein the movable rod extends through the passage.

3. The braking system of claim 2, wherein the passage is defined in a free end of the arm.

4. The braking system of claim 1, wherein the strut further comprises a flange extending from the base.

5. The braking system of claim 4, wherein the actuator is connected to the flange.

6. The braking system of claim 5, wherein the flange is a first flange, and wherein the strut further comprises a second flange, the actuator connected to and between the first flange and the second flange.

7. The braking system of claim 6, wherein the second flange comprises a body and a pocket defined in the body, and wherein a second end of the movable rod is disposed within the pocket.

8. The braking system of claim 7, wherein the pocket is centrally located on the body.

9. The braking system of claim 4, wherein the flange comprises a body and a passage defined in the body.

10. The braking system of claim 9, wherein the strut further comprises a connector flange extending through the passage and threadably connected to the actuator.

11. The brake system of claim 1, wherein the actuator is an air bag.

12. The brake system of claim 1, wherein the base and the arm of the strut are integral and monolithic.

13. The brake system of claim 4, wherein the base, the arm and the flange of the strut are integral and monolithic.

14. A strut for connecting a fixed rod, a movable rod and an actuator in a braking system for a railway car, the strut comprising:
a base extending between a first end and a second end;
a flange extending from the first end of the base, the flange connectable to the actuator;
an arm extending from the second end of the base, the arm extending between a first end connected to the second end of the base and a second free end;
a pocket defined in the arm, the pocket sized to receive the fixed rod therein; and
a passage defined in the second free end of the arm, the passage sized to receive the movable rod therethrough.

15. The strut of claim 14, wherein the base, the arm and the flange are integral and monolithic.

16. The strut of claim 14, wherein the flange is a first flange, and wherein the strut further comprises a second flange, the actuator connectable to and between the first flange and the second flange.

17. The strut of claim 16, wherein the second flange is separate from the base, the arm and the first flange.

18. The strut of claim 16, wherein the second flange comprises a body and a pocket defined in the body, the pocket sized to receive the movable rod therein.

19. The strut of claim 18, wherein the pocket is centrally located on the body.

20. The strut of claim 14, wherein the flange comprises a body and a passage defined in the body.

21. The strut of claim 20, further comprising a connector flange extendable through the passage and threadably connectable to the actuator.

* * * * *